United States Patent
Verbin et al.

(10) Patent No.: US 9,509,484 B2
(45) Date of Patent: Nov. 29, 2016

(54) SCHEME SYSTEM AND METHOD FOR POWER SAVING IN VECTORED COMMUNICATIONS

(71) Applicant: Sckipio Technologies S.I LTD, Ramat Gan (IL)

(72) Inventors: Rami Verbin, Tel Aviv-Yafo (IL); Guy Reina, Giv'atayim (IL); Rani Keren, Tel Aviv-Yafo (IL)

(73) Assignee: Sckipio Technologies S.I Ltd, Ramat Gan (IL)

( * ) Notice: Subject to any disclaimer, the term of this patent is extended or adjusted under 35 U.S.C. 154(b) by 0 days.

(21) Appl. No.: 14/438,090

(22) PCT Filed: Oct. 25, 2013

(86) PCT No.: PCT/IL2013/050865
§ 371 (c)(1),
(2) Date: Apr. 23, 2015

(87) PCT Pub. No.: WO2014/064699
PCT Pub. Date: May 1, 2014

(65) Prior Publication Data
US 2015/0280892 A1    Oct. 1, 2015

Related U.S. Application Data

(60) Provisional application No. 61/895,333, filed on Oct. 24, 2013, provisional application No. 61/834,442, filed on Jun. 13, 2013, provisional application No. 61/718,225, filed on Oct. 25, 2012.

(51) Int. Cl.
*H04L 5/14* (2006.01)
*H04B 3/32* (2006.01)
*H04L 5/00* (2006.01)

(52) U.S. Cl.
CPC . *H04L 5/14* (2013.01); *H04B 3/32* (2013.01); *H04L 5/0007* (2013.01); *H04L 5/0032* (2013.01); *H04L 5/0046* (2013.01); *H04L 5/0089* (2013.01); *H04L 5/1469* (2013.01)

(58) Field of Classification Search
CPC ... H04L 5/003; H04L 5/0005; H04L 5/0007; H04L 5/0037–5/0041; H04L 25/085; H04B 3/32; Y02B 60/30–60/36
See application file for complete search history.

(56) References Cited

U.S. PATENT DOCUMENTS

| | | | |
|---|---|---|---|
| 7,058,833 B1 | 6/2006 | Bremer et al. | |
| 7,817,745 B2 | 10/2010 | Cioffi et al. | |
| 2009/0129304 A1 | 5/2009 | Kim et al. | |
| 2009/0271550 A1 | 10/2009 | Clausen et al. | |

FOREIGN PATENT DOCUMENTS

| | | |
|---|---|---|
| EP | 1 037 426 A1 | 9/2000 |
| EP | 2 341 635 A2 | 7/2011 |
| EP | 2 391 031 A1 | 12/2011 |
| WO | 2012/015714 A2 | 2/2012 |

OTHER PUBLICATIONS

International Search Report and Written Opinion mailed on Mar. 10, 2014, for International Application No. PCT/IL2013/050865, filed Oct. 25, 2013 (14 pages).
Oksman et al., 2010, The ITU-T's new g. vendor standard proliferates 100 mb/s dsl, IEEE Communications Magazine 48.10:140-148.

Primary Examiner — Pao Sinkantarakorn
(74) Attorney, Agent, or Firm — Brown Rudnick LLP

(57) ABSTRACT

A transmission scheme for a plurality of transceiver pairs, the transmission scheme including a partition of at least a downlink transmission portion of a data transmission frame into a plurality of precoding intervals, each precoding interval being associated with a respective active group of transceiver pairs, each active group of transceiver pairs including a plurality of transceiver pairs, each precoding interval terminating no earlier than the end of a respective downlink data transmission period associated with at least one of the transceiver pairs in the respective transceiver active group, wherein, a different respective precoder is associated with each the active groups and wherein, at least the transmitting ports of the first transceivers, which are not members of an active group, turn off.

22 Claims, 13 Drawing Sheets

SCHEME SYSTEM AND METHOD FOR POWER SAVING IN VECTORED COMMUNICATIONS

FIELD OF THE DISCLOSED TECHNIQUE

The disclosed technique relates to time division duplexing (TDD) in modem communications, in general, and to implementing vectoring technology, in particular.

BACKGROUND OF THE DISCLOSED TECHNIQUE

The "last mile" is a phrase in telecommunications, cable television and internet industries relating to the connection of retail customers (e.g., homes or offices) to the pertinent network (e.g., the telephone network or the internet). The "last mile" connections, generally consist of copper twisted pairs, typically exhibit a bandwidth "bottleneck" limiting the rate of data delivery to the customers since twisted pairs where originally deployed to support voice signals, and not to communicate high bit rates typical to broadband Internet access. Furthermore, "last mile" connections are expensive to upgrade (e.g., to optical fibers) due to the large number of such connections (i.e., relative to the number of connections between exchanges or routers).

Reference is now made to FIG. 1, which is a schematic illustration of a typical "last mile" connection which is known in the art. Such a typical "last mile" connection includes a building 10 a distribution point (DP) 20 and a central office 24. Building 10 includes, for example, eight apartments $12_1$-$12_8$. Each of apartments $12_1$-$12_8$ includes, for example, a respective one of computers $14_1$-$14_8$ coupled with a respective one of modems $16_1$-$16_8$ either directly or via a router or hub (not shown). Each one of modems $16_1$-$16_8$ is coupled with distribution point 20 via a respective one of line connections $18_1$-$18_8$ also known as "drops". Each one of line connections $18_1$-$18_8$ is, for example, a twisted pair of wires. Each one of line connections $18_1$-$18_8$ may further be, for example, a coaxial cable. Line connections $18_1$-$18_8$ are grouped together within a binder 22. Distribution point 20 along with line connections $18_1$-$18_8$ and computers $14_1$-$14_8$ constitute a communication system. Distribution point 20 is coupled with Central office 24 via a communication channel 26 (e.g., optical fiber, cable, wireless channel). The distance between building 10 and distribution point 20 is up to the order of hundreds of meters and typically up to 200 meters. The distance between distribution point 20 and central office 24 is up to the order of several kilometers.

It is noted that computers $14_1$-$14_8$ are brought herein as an example only. Other devices require communication services (e.g., smart TV's, smartphones, IP phones, routers) may be coupled with the respective one of modems $16_1$-$16_8$. Furthermore, building 10 may include offices rather than apartments. Additionally, the number of apartments or offices in building 10 may be different than eight (e.g. four, sixteen). Additionally, the distribution point may be connected to a plurality of private homes.

Data transmission includes downstream transmission of data from the DP toward the CPE also referred to as downlink (DL). Data transmission also includes upstream transmission of data from the CPE toward the DP also referred to as uplink (UL). Furthermore, data transmission is divided into data frames, where each frame includes a plurality of time-slots each for transmitting a data symbols (i.e., a combination of bits, which is encoded and modulated to create the data symbol exhibiting the duration of each time-slot). Nevertheless, the terms 'time-slot' and 'symbol' are used herein interchangeably. In each frame, a portion of the symbols may be designated for downlink transmission and a portion of the symbols may be designated for uplink transmission. Frames may further be grouped in super-frames, where each super-frame includes a plurality (e.g., on the order of tens) of frames. Reference is now made to FIG. 2 which is a schematic of a super-frame, generally referenced 50, which is known in the art. Super-frame 50 includes a plurality of frames. The duration of super-frame 50 may be on the order of several milliseconds (ms) and typically 6 ms and each frame typically includes between 20 symbols and 40 symbols. Each frame, for example, frame 52, which corresponds to the second frame of super-frame 50, includes a plurality of time-slots, such as time-slot 54 for transmission of data symbols.

"G.fast" technology attempts to increase the data rate between the distribution point and the Customer Premise Equipment (CPE—such as modems, routers, hubs, computers, Smart TV's and the like) to the order of one Giga bits per second (i.e., 1 Gbps). Typically, the bandwidth of each twisted pair is between 100-200 Megahertz (MHz) and the number of twisted pairs per binder is between eight and sixteen. As a result of the high frequencies employed, a high degree of cross-talk interference exists between the different twisted pairs in the binder. In essence, due to the high level of cross-talk, the coupling between the distribution point and different CPE's may be considered as a multiple access problem where a plurality of devices are coupled with the plurality of CPE's. Such a coupling or channel may be described in a matrix form where the entries in the matrix represent the different coupling factors. Cancelling cross-talk interference is also referred to as "vectoring". Vectoring means the use of one or both of precoding in the downlink direction and cross-talk cancellation in the uplink direction. In general, power consumption is of utmost importance for system implementations designed to be installed in the distribution point.

In general, two primary parameters are associated with each user, the line capacity (i.e., the achievable bit rate of the line assuming continues transmission) and the service rate (i.e., the bit rate that the customer is subscribed to or that the service provider is committed to provide). These two parameters may be different one with respect to the other. Each customer may be subscribed to a different service rate. Each of the different lines connected to the Distribution Point may also have different capacities due to the differences in the distance from the DP, differences in the home wiring, differences in the lines attenuation and cross-talk within the binder (common in the high frequencies) and differences in the background noise levels. The differences in the line capacities and the service rates translate to variations in the required transmission durations for each line. The transmission duty-cycle is determined according to the ratio between the service bit-rate and the line capacity. For example, if the service bit-rate is 100 Mbps and the line capacity is 200 Mbps we will have to transmit for approximately 50% of the time (i.e., ignoring the gaps and overheads). In general, transmission duty-cycles may vary between say 10% (1 Gbps line capacity, 100 Mbps service) to 100% (100 Mbps line capacity, 100 Mbps service).

U.S. Pat. No. 7,817,745 to Cioffi et al entitled "Tonal Precoding" describes therein, a Digital Subscriber Line (DSL) communication system which employs Discrete Multi-Tone (DMT) transmission and precoding in which U transmitters of U users are connected with U receivers employing Frequency Division Duplexing (FDD). The channel from the U transmitters to their U receivers can be modeled by a matrix channel H, whose size usually is U×U. The channel H can be decomposed into H=RQ using RQ factorization of a square matrix where the Q matrix can be used as a linear filter and R matrix can be used as a feedback filter for alleviating cross-talk. In one embodiment directed to by Cioffi et al, a G matrix in R=SG (where S is a diagonal scaling matrix that forces the diagonal elements of the triangular G to be all ones) can be interpreted as a set of precoder coefficients for the U users. These precoder coefficients can vary with each tone used by each user and depend upon the encoding order of users selected for each tone. In practice, the channel H is variable and the R and Q matrices are updated to adapt to such variability.

One of the embodiments directed to by Cioffi et al, employs adaptive precoding. Adaptive precoding adapts the precoding elements (e.g., the R, Q matrices, precoding coefficients, etc.) to changing channel or noise conditions or to both. In the adaptive system directed to by Cioffi et al, either the matrix R or the matrix Q or both may be updated by a controller as frequently as needed to match the time-variations of the channel, as well as the noise. Such updating may be triggered directly (e.g., by changes to the channel matrix H or to the noise spatial correlation $R_{nn}$), or indirectly (e.g., by changes to the bit tables or to the gain tables of the users of the vectored DSL system, or by changes to the precoding order within a tone, for the users of the vectored DSL system). The precoder may be updated after one or more of the receivers request new settings for the bit and gain tables of the vectored DSL transmitters. The precoder may also be updated after one or more of the users of the vectored DSL system are turned off, or after one or more users are added to the vectored DSL system.

U.S. Pat. No. 7,058,833 to Bremer et al, entitled "System and Method for Minimized Power Consumption for Frame and Cell Data Transmission Systems" directs to a transmitter power manager for reducing power in a communication system in which a communication device which is coupled with a plurality of communication connections. The transmitter power manager, which resides in the transmitter located in the central office, employs a data detector and power enabling circuitry. The data detector detects activity corresponding to an incoming communication signal which is to be transmitted. When such activity is detected the data detector provides a control signal to power enabling circuitry. The power enabling circuitry is coupled to selected elements in the transmitter and with the transmitter signal generating circuitry which may be powered down during periods of inactivity. When a control signal is received, which indicates the presence of an incoming communication signal which is to be transmitted, the power enabling circuitry provides power to the selected elements so that the selected elements are fully powered and ready to transmit the communication signal. When the communication signal has been transmitted, the data detector detects the end of the transmission and provides a control signal to the power enabling circuitry such that the selected components are then powered down. That is, during periods of transmitter inactivity, selected elements residing in the transmitter or the transmitter signal generating circuitry are powered down. When incoming communication signal, which are to be transmitted are detected, the power enabling circuitry turns on the selected elements.

SUMMARY OF THE PRESENT DISCLOSED TECHNIQUE

It is an object of the disclosed technique to provide a novel transmission scheme method and system in a multi-user TDD communications system.

In accordance with the disclosed technique, there is thus provided a transmission scheme for a plurality of transceiver pairs. Each transceiver pair includes a first transceiver and a second transceiver. Each transceiver includes a transmitter and a receiver. Each of the transceiver pairs define a down-link between the transmitter of a first transceiver and the receiver of a second transceiver and further define an uplink between the transmitter of the second transceiver and the receiver of the first transceiver. The transmitter of the first transceiver includes a pre-precoder coupled with the input of a precoder and a transmitting port coupled with the output of the precoder and with the receiver of the second transceiver. Each transceiver pair transmits data over at least a portion of a data transmission time-frame. The data transmission frame is partitioned into a downlink transmission portion and an uplink transmission portion. The transmission scheme includes a partition of at least the downlink transmission portion of the transmission frame into a plurality of precoding intervals. Each precoding interval is associated with a respective active group of transceiver pairs. Each active group of transceiver pairs includes a plurality of transceiver pair. Each precoding interval terminating no earlier than the end of a respective downlink data transmission period associated with at least one of the transceiver pairs in the respective transceiver active group. A different respective precoder is associated with each the active groups. At least the transmitting ports of the first transceivers, which are not members of an active group, turn off.

In accordance with another aspect of the disclosed technique, there is thus provided a method for determining a transmission scheme for a plurality of transceiver pairs. Each transceiver pair includes a first transceiver and a second transceiver. Each transceiver includes a transmitter and a receiver. Each the transceiver pairs defines a downlink between the transmitter of a first transceiver and the receiver of a second transceiver and further define an uplink between the transmitter of the second transceiver and the receiver of the first transceiver. Each transceiver pair transmits data over at least a portion of a data transmission frame. The data transmission frame is partitioned into a downlink transmission portion and an uplink transmission portion. The method includes the procedure of determining at least one transmission mode. Each of the at least one transmission mode is defined by a respective at least one active group of transceiver pairs at least during the downlink transmission portion. The method further includes the procedure of estimating for each determined transmission mode, at least one expected respective bit-rate and at least one expected respective power dissipation both associated with the at least one active group. The method also includes the procedure of determining a transmission plan corresponding to each transmission mode according to data transmission information, power dissipation information, the at least one expected respective power dissipation, the at least one expected respective bit rate associate with the at least one active group and according to service level agreement.

In accordance with a further aspect of the disclosed technique, there is thus provided a communications system. The communication system includes a distribution point. The distribution point includes a plurality of distribution point transceivers and a vectoring controller. Each distribution point transceiver includes respective pre-precoder, a respective transmission port and a respective receiver. The system further includes a vectoring controller coupled with each of the distribution point transceivers. Each distribution point transceiver transmits data over a data transmission frame. The data frame is partitioned into an uplink transmission portion and a downlink transmission portion. The vectoring controller at least determines precoding matrices corresponding to each of at least one active group of distribution point transmitters. At least the transmitting ports of the distribution point transceivers, which are not members of an active group, turn off.

In accordance with another aspect of the disclosed technique, there is thus provided a transmission scheme for a plurality of transceiver pairs. Each transceiver pair includes a first transceiver and a second transceiver. Each transceiver includes a transmitter and a receiver. Each of the transceiver pairs define a downlink between the transmitter of a first transceiver and the receiver of a second transceiver and further define an uplink between the transmitter of the second transceiver and the receiver of the first transceiver. Each transceiver pair transmits data over at least a portion of a data transmission frame. The data transmission frame is partitioned into a downlink transmission portion and an uplink transmission portion. The transmission scheme includes a partition of at least the uplink transmission portion of the data transmission frame into a plurality of time segments. Each time segment is associated with a respective uplink active group of transceiver pairs. Each uplink active group of transceiver pairs includes a plurality of transceiver pairs. Each time segment terminates no earlier than the end of a respective uplink data transmission period associated with at least one of the transceiver pairs in the respective transceiver active group. Cross-talk cancellation is performed only between the receivers of the first transceivers in the active group of transceiver pairs. The receivers of the first transmitters which are not members of an active group turn off.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1:
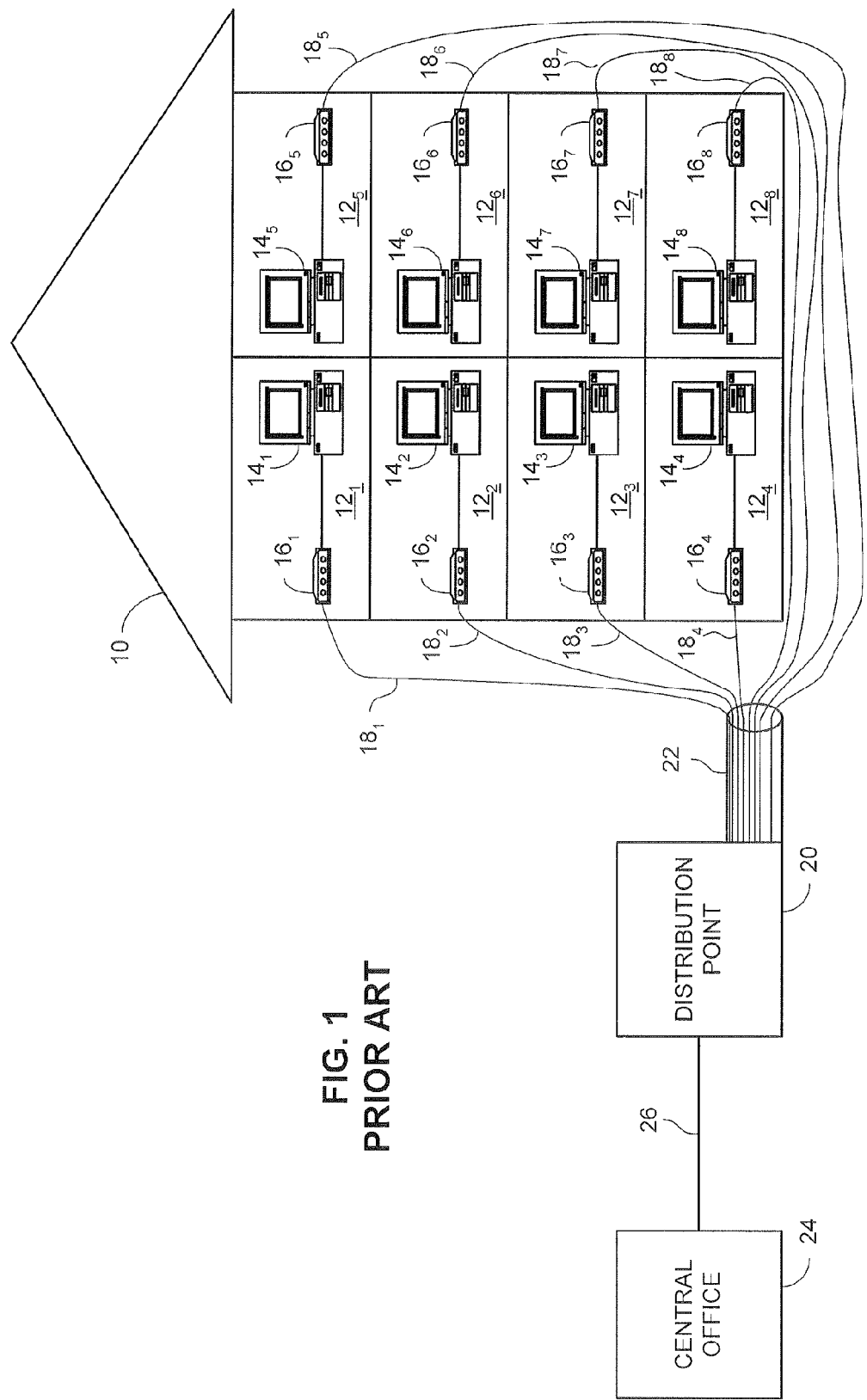
FIG. 1 is a schematic illustration of a typical "last mile" connection, which is known in the art.
Figure 2:
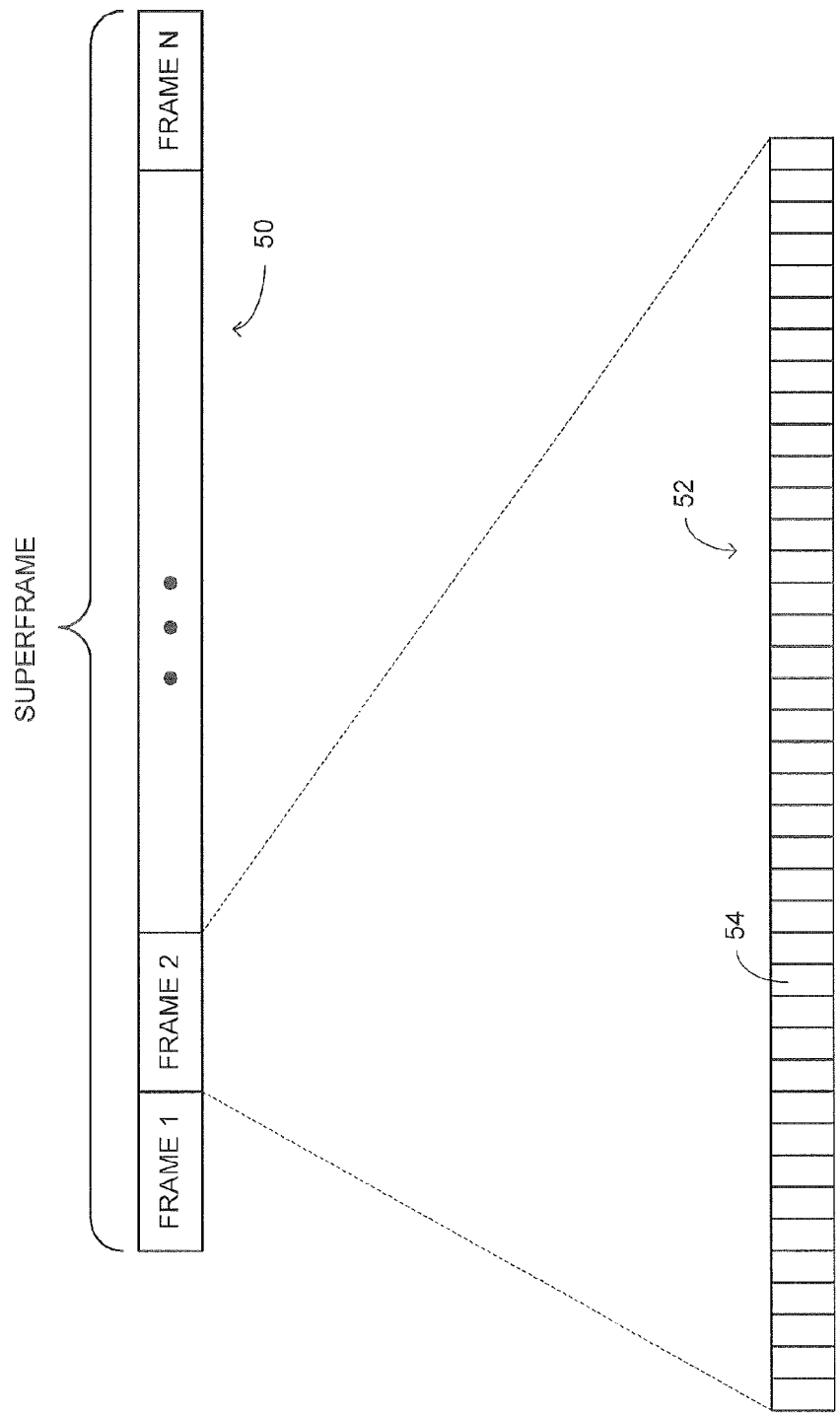
FIG. 2 is a schematic of a super-frame, which is known in the art.

The disclosed technique overcomes the disadvantages of the prior art by providing a transmission scheme in a multi-user TDD communications system, in which a transmission plan corresponds to one a transmission mode. The transmission mode may of a discontinuous type, continuous type or hybrid type. The discontinuous type optimizes either power consumption, the continuous type optimizes performance and the hybrid type facilitates a tradeoff between power consumption, performance and complexity respectively. The term 'performance' herein relates either to the transmitted bit-rate (i.e., actual or maximum transmitted bit-rate) or to the channel capacity or to both. The system according to the disclosed technique may operate according to transmission mode which is one of the above mentioned types continuously, or switch between different transmission modes from time to time (e.g., every frame, every several frames, every super-frame or every several super-frames) as further explained below. Switching between the transmission modes may be based on power and data traffic demands. For example, the system according to the disclosed technique may determine on a frame by frame basis or on a super-frame by super-frame basis, according to which transmission mode a transmission plan shall be determined (i.e., the transmission mode may not change at all). It is noted that the disclosed technique is applicable for both wired and wireless communication systems and thus the term 'coupled' herein below refers to wirelessly coupled as well as to coupled by wire.

According to the transmission scheme of the disclosed technique, a transmission mode is defined according to the active group or groups of transceivers. In a transmission mode corresponding to the discontinuous or hybrid transmission types, each transmission frame (i.e., either the downlink transmission or the uplink transmission) is partitioned into a plurality of time intervals or time segments. In the downlink, the time segments are also referred to as precoding intervals. The active group of transceivers in each time segment (i.e., the group of transceivers transmitting in a given time segment) may be different for each time segment. According to the disclosed technique, a different precoder is employed for each time segment or time segments according to the active group of transceivers transmitting during that time segment. The active groups are selected to either minimize the power consumption of the DP and the CPE transmitters, or to facilitate a tradeoff between the power consumption, bit-rate and complexity. The term 'complexity' herein relates to the need to determine in real time or store in advance a precoder matrix or matrices (i.e., as farther explained below) for each active group, given the memory allocated for storing the precoder matrices may be limited. In a transmission mode of the continuous type, there is one active group and all the transmitters continue to transmit a residual cancellation signal, after transmitting the respective data thereof, until the transmitter with the longest data transmission period, finishes transmitting the respective data thereof. Transceivers (i.e., pre-precoder and transmitting ports), which are not a part of the active group may be turned off.

A communications system according to one embodiment of the disclosed technique (e.g., system 300 in FIG. 11 below) employs Discrete Multi-Tone (DMT) transmission in which the transmission bandwidth is divided into a plurality of sub-carriers. Due to the variation of the channel characteristics over frequency, each sub-carrier is further associated with a different respective precoder matrix and with a respective modulation constellation such as 64 Quadrature Amplitude Modulation (QAM), 256 QAM and the like. The respective precoder matrix is determined according to the channel characteristics associated with the respective sub-carrier. It is noted that herein below the term 'precoder' relates in unison the precoding matrices of all the sub-carriers. The respective modulation constellation of each sub-carrier is typically determined according to the available signal to noise ratio for the respective sub-carrier and additional parameters such as the required bit-rate and power constraints, error events statistics and the like. The allocation of the constellations to the different sub-carriers (i.e., the number of bits assigned to each symbol of each sub-carrier) is specified in a Bit Loading Table (BLT) for each link.

The time duration of a symbol (i.e., a time-slot) in a frame, along with a sub-carrier, define a Logical Allocation Unit (LAU). Thus, each frame may be regarded as a two dimensional array of LAUs. Each user is allocated respective set of LAUs that may be used for transmission (i.e., downlink transmission and uplink transmission). This set of LAUs defines an 'active-set' used for transmission. Furthermore, the term "transmission opportunity" herein refers to either a time-slot or an LAU in an active-set. Furthermore, the term "transmission plan" refers herein to the allocation of transmission opportunities (i.e., either downlink or uplink) for the DP transceivers and the CPEs transceivers. These transmission opportunities define the transmission duration of each transceiver. However, it is noted that the DP or the CPEs need not necessarily use all the allocated transmission opportunities thereto.

In general, as mentioned above, in a transmission scheme according to the disclosed technique, a transmission plan corresponds to a transmission mode. The transmission mode may be one of continuous type, discontinuous type or hybrid type as described herein below conjunction with FIGS. 5, 6, 7, 8 and 9. The active groups define the transmission mode. The transmission plan (i.e., the allocation of transmission opportunities) defines demarcation points (i.e., the points in time at which selected transmitters shall turn-off), which define the partition of the data frame into time-segments and thus define the active group of transmitters associated with each time segment. Each time segment terminates no earlier than the end of a respective downlink data transmission period of at least one of the transceivers the respective active group. In the downlink, each time segment (i.e., each active group of transmitters) is associated with a respective precoder and a respective BLT for each link. Alternatively, several of the time segment or the entire frame may be associated with the same BLT. In the uplink, each time segment in a transmission mode is associated with a respective BLT for each link. Furthermore, each active group in a transmission mode is associated with a respective expected bit-rate for each link and the expected respective power dissipation for each one of the uplink and the downlink.

Cancellation of cross-talk in general and of Far End Cross-talk (FEXT) in particular, involves pre-compensating (i.e., precoding) the transmitted signal such that the cross-talk is negated at the receiver. Cancellation of cross-talk entails evaluating the effect of cross-talk that is experienced on a known training signal during its transmission through the communication channel. To apply appropriate precoding and thus substantially eliminate or minimize FEXT, the joint characteristics of the various communication links (i.e., "channel characteristics") need to be evaluated. This is also known as channel estimation. Channel estimation (or channel matrix estimation) involves estimating the elements in a channel matrix H as well as other performance parameters such as SNR and signal attenuation level. The channel matrix H is estimated for each sub-carrier k (denoted herein by $H^{(k)}$) for M communication links, may be generally be represented by as follows:

$$H^{(k)} = \begin{pmatrix} h_{11}^{(k)} & \cdots & h_{1M}^{(k)} \\ \vdots & \ddots & \vdots \\ h_{M1}^{(k)} & \cdots & h_{MM}^{(k)} \end{pmatrix}. \tag{1}$$

The diagonal elements in channel matrix H (i.e., $H_{ii}$ where i is an integer between 1 and M) represent the direct i-th communication link corresponding to the transfer function of the transmitted signal on the i-th communication link. Off-diagonal elements in channel matrix H (i.e., $H_{ij}$ where i≠j and are both integers between 1 and M) represent the FEXT coupling coefficients between the i-th and j-th communication links.

In general, a received signal which was transmitted over a channel exhibiting cross-talk may be modeled as follows:

$$\begin{bmatrix} y_k^1 \\ \vdots \\ y_k^M \end{bmatrix} = \begin{bmatrix} h_{11}^{(k)} & \cdots & h_{1M}^{(k)} \\ \vdots & \ddots & \vdots \\ h_{M1}^{(k)} & \cdots & h_{MM}^{(k)} \end{bmatrix} \begin{bmatrix} x_k^1 \\ \vdots \\ x_k^M \end{bmatrix} + \begin{bmatrix} z_k^1 \\ \vdots \\ z_k^M \end{bmatrix} \tag{1}$$

where $y_k^m$ is the received signal of the $m^{th}$ user over the $k^{th}$ sub-carrier, $x_k^m$ is the transmitted signal of the $m^{th}$ user over the $k^{th}$ sub-carrier and $z_k^m$ is a noise signal added to $x_k^m$. In matrix notation equation (1) may be written as follows:

$$y_k = H_k x_k + z_k \tag{2}$$

To alleviate the cross-talk, the transmitted signal is multiplied by a respective precoder matrix P as follows:

$$y_k = H_k P_k x_k + z_k \tag{3}$$

According to equation (3), the precoder output relating to the $i^{th}$ communication link includes data relating to all the other links (i.e., to enable the cancellation of the cross-talk from the other links). The cross-talk may be alleviated by setting $P_k$ to be equal to $H_k^{-1}$. However, in such a case, the precoding gain is lost (i.e., since the diagonal elements of $H_k$ are set to be equal to one). To maintain the precoding gain, $P_k$ may be set equal to the following:

$$P_k = H_k^{-1} \text{diag}\{H_k\} \quad (4)$$

where $\text{diag}\{H_k\}$ is a matrix including the diagonal elements of $H_k$ with the off-diagonal elements set to zero.

The precoding described above in conjunction with equation (3) is known as linear precoding. Nevertheless, according to the disclosed technique, non-linear precoding may alternatively be employed. Non-linear precoding attempts to cancel interferences known to the transmitter prior to the transmission of the data. Thus the SNR may be increased without increasing the transit power. Non-linear precoding, also referred to as dirty paper coding (DPC), includes methods such as Tomlinson-Harashima precoding (i.e., employing modulo arithmetic operation), Costa precoding, the "vector perturbation technique", and the like. Typically, non-linear precoder has better error related performance than a linear precoder but a non-linear precoder is harder to implement.

Figure 3:
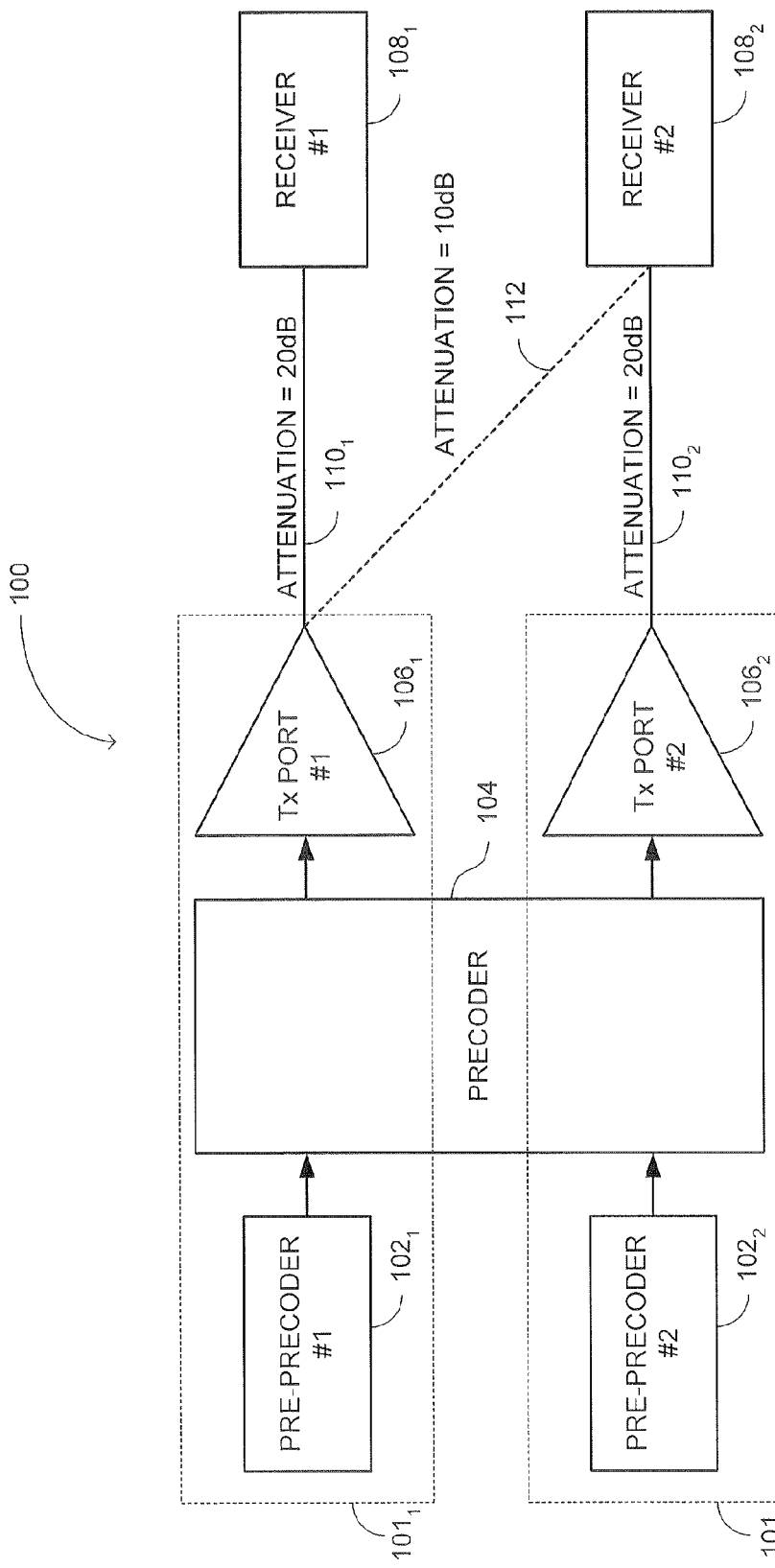
FIG. 3 is a schematic illustration a simplified multi-user communications system in accordance with an embodiment of the disclosed technique.

In a vectored transmission system, the transmission bit-rate may be affected by the cross-talk channels. In some cases, the cross-talk may increase the Signal to Noise Ratio (SNR) for a specific link and consequently improve the achievable bit-rate for that link (e.g., when the attenuation in the cross-talk channel is lower than the attenuation in the direct channel). Thus, eliminating that cross-talk channel (e.g., by turning off the interfering transmitter) may result in the degradation of the transmitted bit-rate. Reference is now made to FIG. 3, which is a schematic illustration a simplified multi-user communications system, generally referenced 100, in accordance with an embodiment of the disclosed technique. Exemplary system 100 includes two users and exemplifies a mode where the attenuation in the cross-talk channel is lower than the attenuation in the direct channel. System 100 includes a first transceiver $101_1$, second transceiver $101_2$, a precoder 104, a first receiver $108_1$ and a second receiver $108_2$. Each one of first transceiver $101_1$ and second transceiver $101_2$ includes a respective first pre-precoder $102_1$ and second pre-precoder $102_2$. Each one of first transceiver $101_1$ and second transceiver $101_2$ further include a respective first transmitting port $106_1$ and second transmitting port $106_2$.

Precoder 104 is coupled with first pre-precoder $102_1$, second pre-precoder $102_2$, with first transmitting port $106_1$ and with second transmitting port $102_2$. First transmitting port $106_1$ is coupled with first receiver $108_1$ via a first direct link indicated by line $110_1$. Second transmitting port $106_2$ is coupled with second receiver $108_2$ via a second direct link indicated by line $110_2$. First transmitting port $106_1$ is further coupled with second receiver $108_2$ via a cross-talk link as indicated by dashed line 112.

First pre-precoder $102_1$ and second pre-precoder $102_2$ generate a stream of symbols to be transmitted to receivers $108_1$ and $108_2$ respectively. Precoder 104 encodes the symbols to overcome the interference caused by the cross-talk between first direct link $110_1$ and second direct link $110_2$. To that end, for example, linear precoding such as described above in equation (3) is employed. Thus, each transmitting port transmits a signal which is a combination of the information related to all the transmitters. Due to the cross-talk between the channels, a receiver may receive the data directed thereto via the cross-talk link as well as via the direct link. In the exemplary system depicted in FIG. 3, receiver $108_2$ receiver data transmitted thereto by transmitter $102_2$ via first transmitting port $106_1$ as well as via transmitting port $106_2$. Furthermore, the attenuation in both link $110_1$ and link $110_2$ is 20 decibels (dB). The attenuation via cross-talk link 112 is only 10 dB. Thus, second transmitter $102_2$ may communicate with second receiver $108_2$ via first transmitting port $106_1$ as well as via first transmitting port $106_1$. In fact, such an optimal precoder may use both the direct channel and the cross-talk channel to communicate with receiver $108_2$.

In light of the above, turning off either transmitter $102_1$ or transmitting port $106_1$ shall result in a degradation in the performance of the link between transmitter $102_2$ and receiver $108_2$ (i.e., since the precoder matrix was determined to facilitated overcoming cross-talk interference when transmitting port $106_1$ transmits data). Furthermore, when turning off transmitting port $106_1$, the received signal power at receiver $108_2$ shall drop by 10 dB, which may result in errors since the signal to noise ratio may now be too low for the required bit-rate and the frequency equalizer (FEQ) at the receiver to will not match the new channel conditions. Consequently, once transmitting port $106_1$ is turned off, the transmit power from transmitting port $106_2$ should be increased by 10 dB. However, increasing the transmit power may not be possible due to limitations on the upper limit of the transmitter power spectral density (PSD). In light of the above, for high cross-talk level environments, power savings, achieved by turning off transmitter ports, may be traded off with achieving the highest possible bit-rate. It is noted that this trade off does not relate to the ability to determine the optimal precoder but rather to the theoretical achievable bit-rate when links are turned off.

Figure 4:
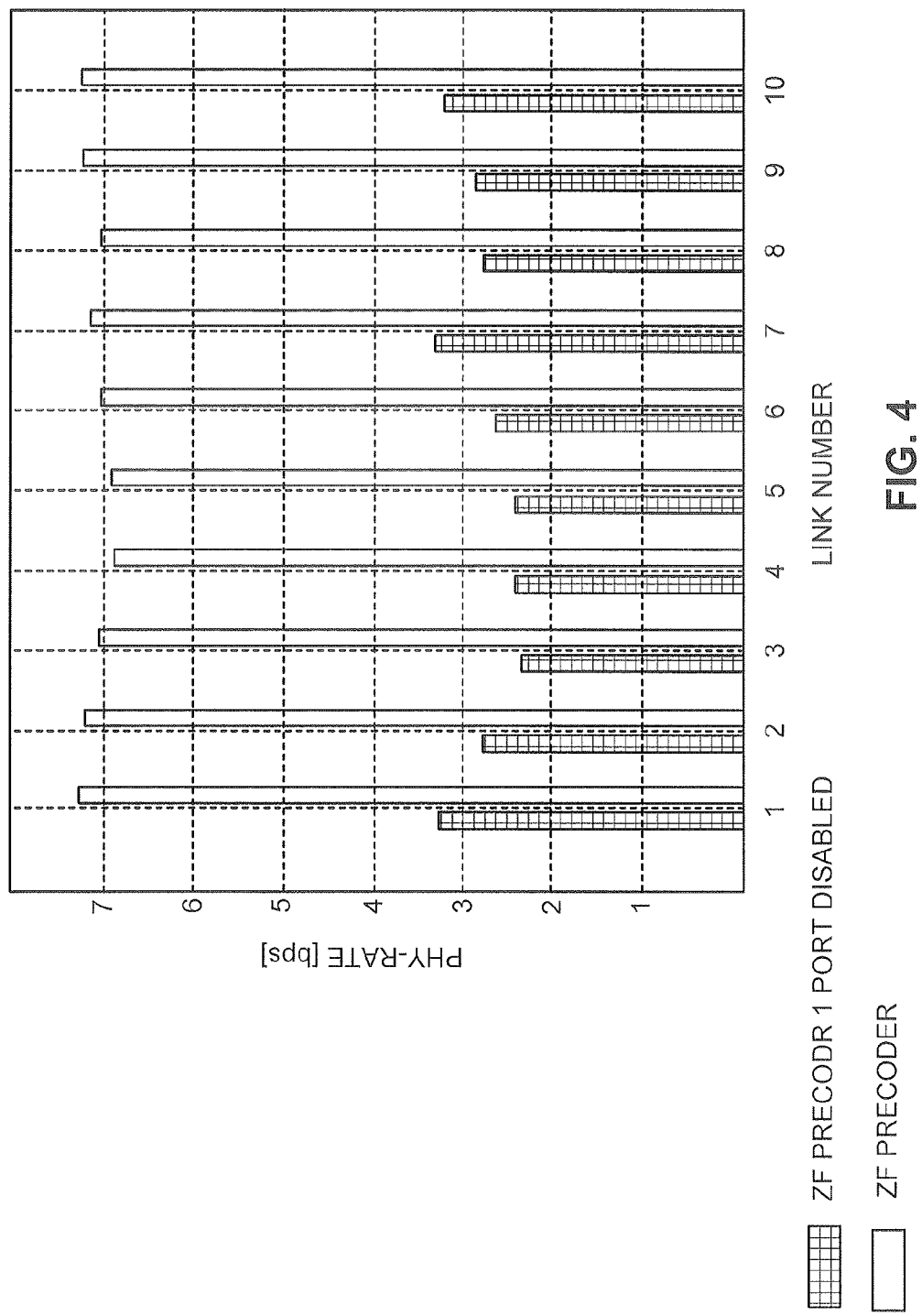
FIG. 4 is a schematic illustration of a chart depicting the implications of turning-off one link in a vectored transmission group without coordination in accordance with another embodiment the disclosed technique.

As described above, shutting down a transmitter may result in degradation in performance. Reference is now further made to FIG. 4, which is a schematic illustration of a chart depicting the implications of turning-off one link (i.e., turning off at least the transmitting port) in a vectored transmission group without coordination (i.e., keeping the same precoder), in accordance with another embodiment the disclosed technique. FIG. 4 depicts the maximum bit-rate performance, designated 'PHY-RATE [bps]', for each link of a ten wire binder, when all links are active and when one of the ports is disabled, without changing the precoder matrix (i.e., no coordination). The results depicted in FIG. 4 assume Zero Forcing (ZF) precoder employed with a British Telecom's (BT) ten line binder and a bandwidth of 100 MHz. As can be seen in FIG. 4, turning off a transmitting port results in the degradation of the achievable bit-rate. To avoid such a degradation, turning off a port should be coordinated (i.e., a new precoder should be determined). To allow different transmission durations per link, as described below, a new precoder should be determined according to the number of active links.

Figure 5:
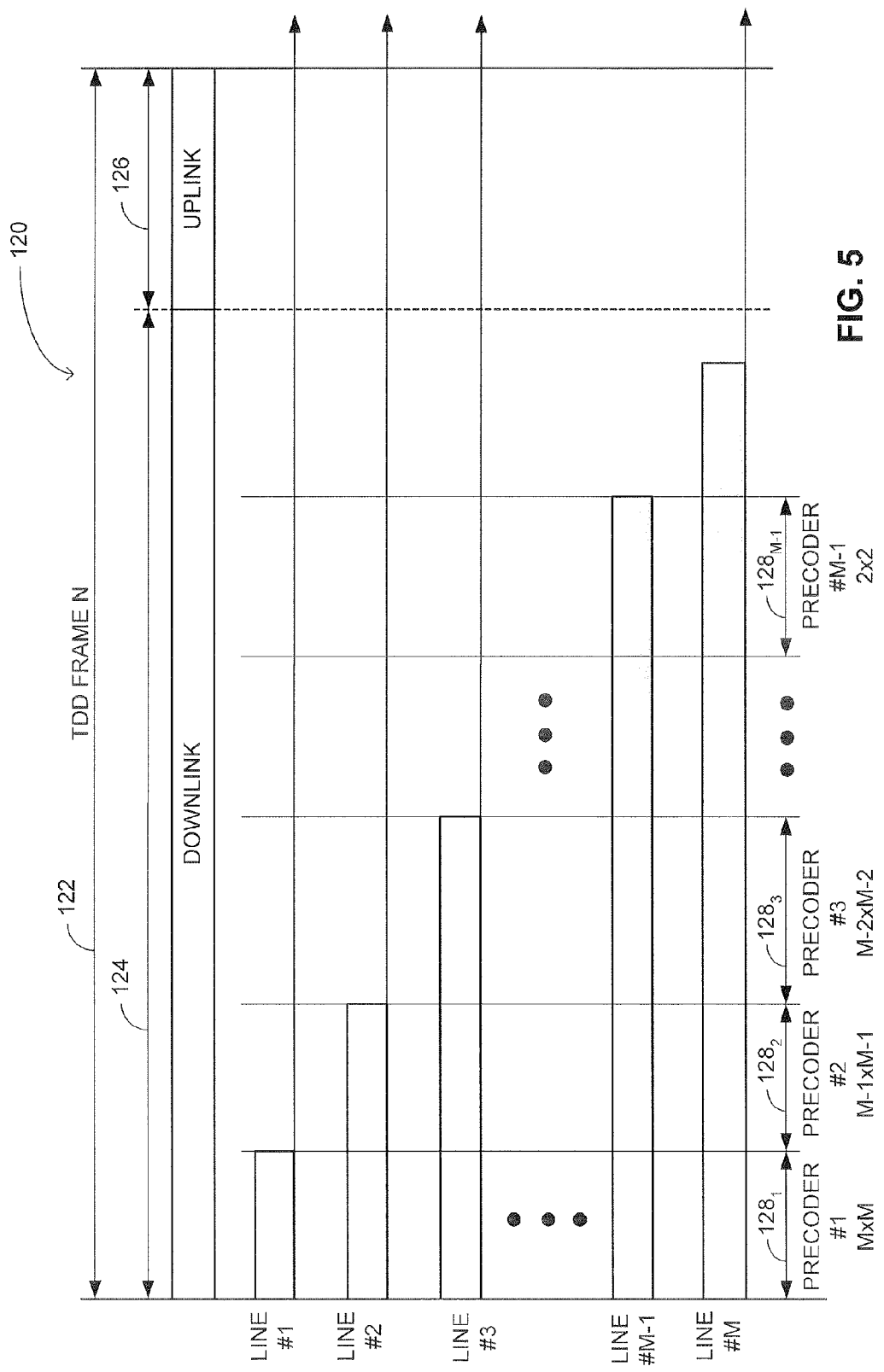
FIG. 5 is a schematic illustration of a transmission scheme corresponding to an exemplary transmission mode of the discontinuous type, in accordance with another embodiment of the disclosed technique.

As mentioned above, in a transmission scheme according to the disclosed technique a transmission mode may be optimized for minimizing the power consumption of the transmitters. A transmission mode minimizing the power consumption of the transmitters is of a discontinuous type. Reference is now made to FIG. 5, which is a schematic illustration of a transmission scheme corresponding to an exemplary transmission mode of the discontinuous type, generally referenced 120, in accordance with another embodiment of the disclosed technique. FIG. 5 depicts a TDD frame 122, partitioned into a downlink time-period 124 and an uplink time-period 126 in which M users are transmitting over M links and where the data transmission durations are different for each user. In FIG. 5, the different line capacities, the different service rates as well as the different amount of data to be transmitted in each link may result in different data transmission durations for each link. Further in FIG. 5, the links are ordered according to their data transmission durations. The data transmission is referred to as payload in FIG. 5.

To minimizing the power consumption each transmitter turns off after completing the transmission of the data thereof. To enable a transmitter to turn off after that transmitter transmitted the data thereof, a different precoder is determined for each group of active transceiver (i.e., the transmitters which currently transmit). In other words, a precoder is determined for each time one of the transceivers is turned off and that precoder is employed by the remaining active transmitters. Accordingly, in FIG. 5, M−1 precoders are determined for M−1 different active group (i.e., a precoder is not needed when only one link is active) and respective of M−1 precoding intervals (i.e., time segments). The term 'active group' relates herein above and below to the group of transmitters currently transmitting (i.e., either the respective payload data thereof or a residual cancellation signal). For example, during precoding interval $128_1$, the active group includes all M transmitters. During precoding interval $128_2$, the active group includes transmitter 2 to M. During precoding interval $128_3$, the active group includes transmitter 3 to M and during precoding interval $128_{M-1}$, the active group includes transmitter M−1 and M. Transmission scheme 120 presented in conjunction with FIG. 5, requires memory allocation for storing all the determined precoding matrices for each active group of transmitters. Alternatively, according to transmission scheme 120 presented in conjunction with FIG. 5, precoder corresponding to an active group is determined during the precoding intervals corresponding to previous active groups or in real time when needed. For example, the precoder #3 is determined during precoding intervals $128_1$ and $128_2$. In both case, the precoder changes whenever a transmitter (i.e., at least the transmitting port) is turned off.

Figure 6:
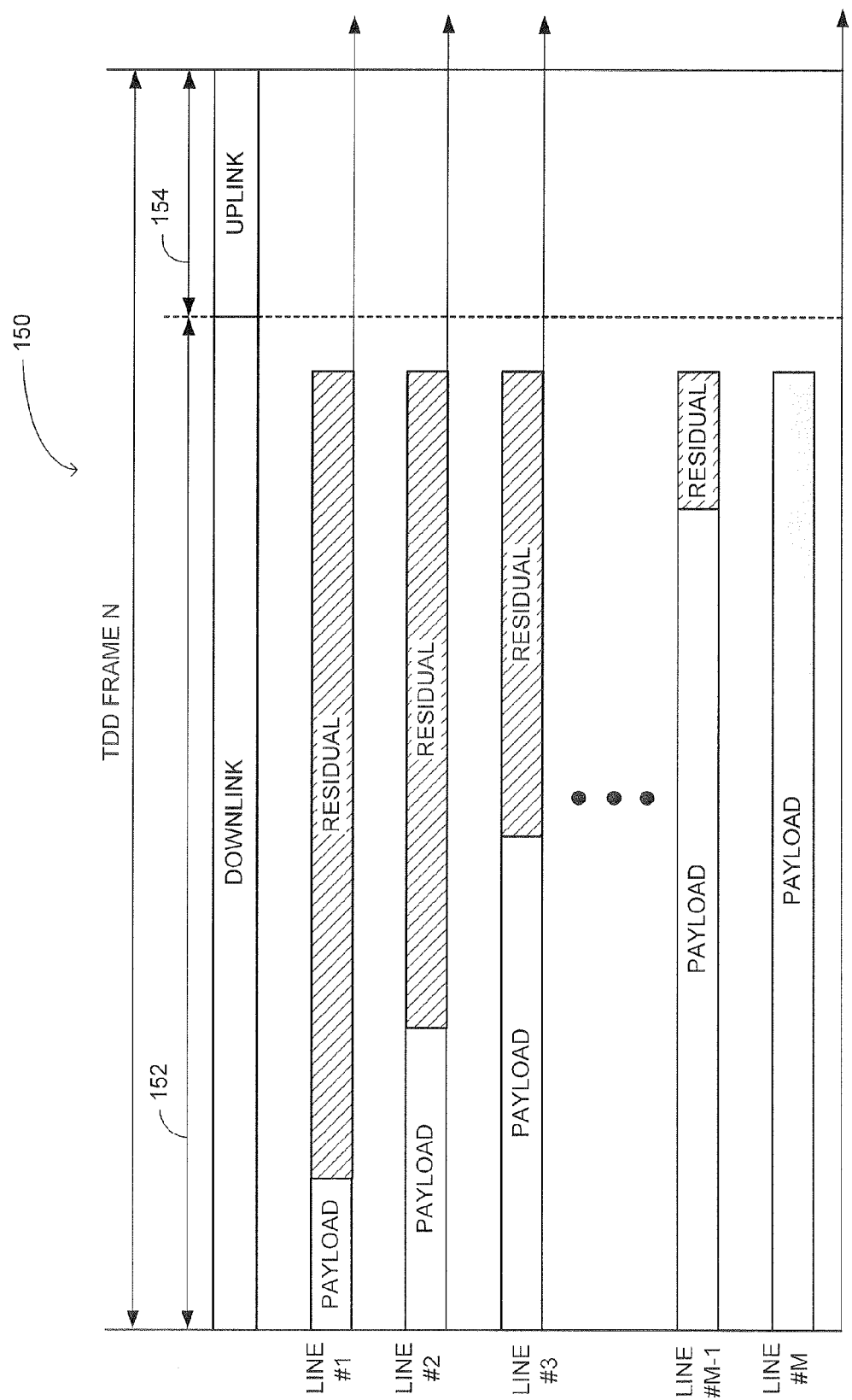
FIG. 6 is a schematic illustration of a transmission schemes corresponding to an exemplary transmission mode of to the continuous type, accordance with a further embodiment of the disclosed technique.

As mentioned above, in a transmission scheme according to the disclosed technique a transmission mode may be optimized to maximize the bit-rate. A transmission mode maximizing the bit-rate corresponds to the continuous type. Reference is now made to FIG. 6, which is a schematic illustration of a transmission schemes corresponding to an exemplary transmission mode of to the continuous type, generally referenced 150, accordance with a further embodiment of the disclosed technique. Transmission scheme 150 depicted in FIG. 6 includes a TDD frame 152, partitioned into a downlink time-period 154 and an uplink-time period 156, in which M users are transmitting over M links and where the data transmission durations are different for each user. In FIG. 6, the different line capacities, the different service rates as well as the different amount of data to be transmitted in each link result in different data transmission durations for each link. Further in FIG. 6, the lines are ordered according to their data transmission durations. However, all the links in FIG. 6 continue to transmit residual cancellation signals after the end of the transmission of the respective data thereof. In other words, there is only one active group. Thus, if one receiver receives the data directed thereto via a cross-talk channel as well as via the direct channel, that receiver shall continue to receive the data directed thereto via the cross-talk channel even when the interfering transmitter finishes transmitting the data associated therewith and transmits only residual cancellation signals. Consequently, the SNR is not affected, the data bit-rate is maximized and only a single precoder (i.e., a precoder matrix for each sub-carrier) is determined. It is noted that that the transmitters transmitting a residual cancellation signal do not have to generate any residual data. It is sufficient for the modulator in the respective transceiver to generate zeros at the input to the precoder matrix. After applying the precoder, the signal at the output of the precoder may be a non-zero signal. It should be noted that for cases where the precoder exhibits only limited cross-talk cancellation capabilities, higher rates may actually be achieved for a small number of active links. This is because in such cases, the cross-talk is the dominant factor (i.e., as described above in conjunction with FIG. 3) and turning off the transmitters corresponding to these links eliminates the cross-talk induced thereby.

In transmission scheme 150, all the downlink transmitters remain active at least until the link with the longest data transmission duration has transmitted the data thereof. Thus, transmission scheme 150 results in larger power consumption relative to transmission scheme 120 in FIG. 5 above. It is noted that the downlink receivers do not necessarily have to be active when the corresponding transmitter transmits the residual data thereof. The residual information does not include information that needs to be received by the receiver.

Figure 7:
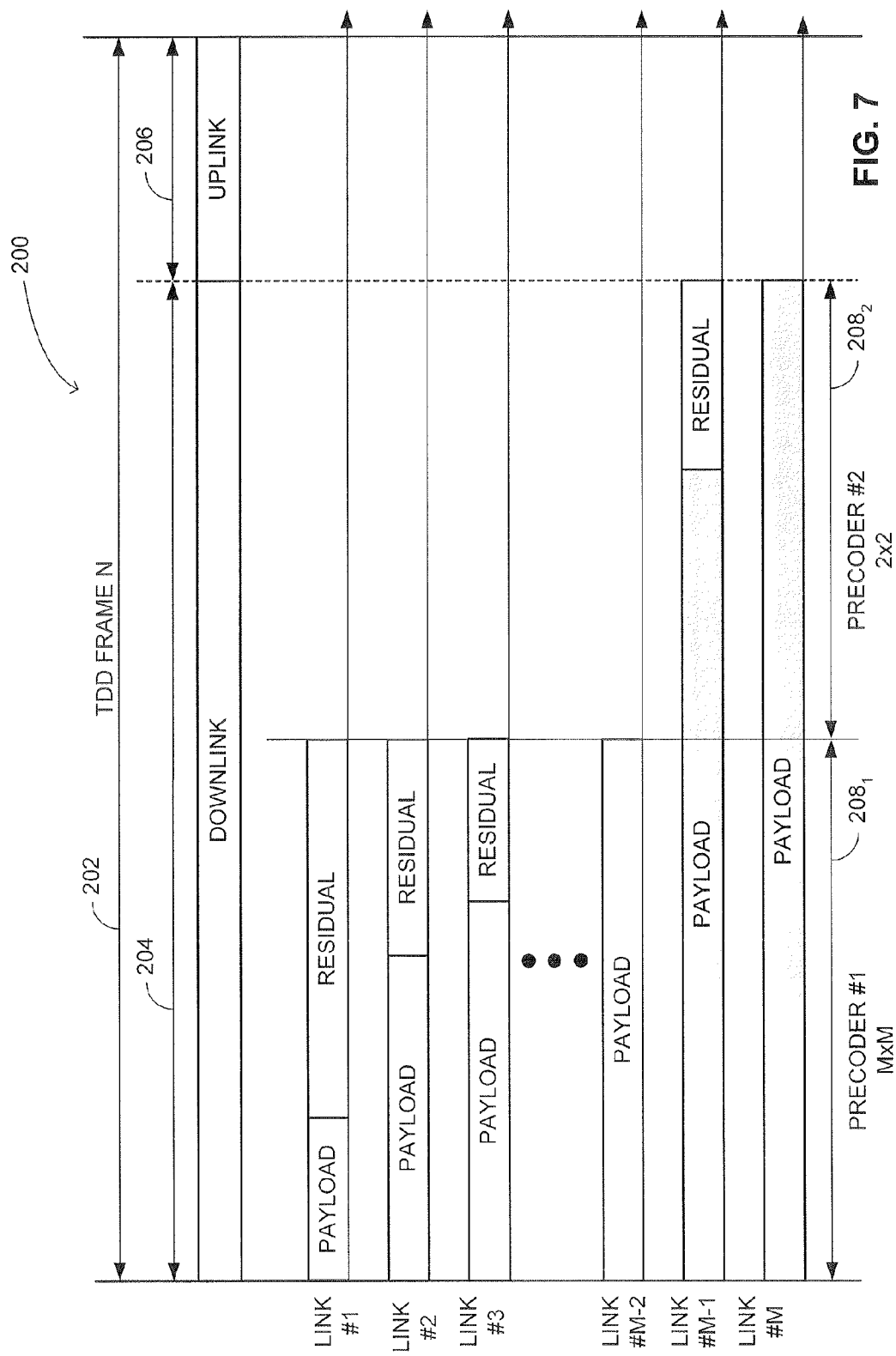
FIG. 7 is a schematic illustration of a transmission scheme to corresponding to an exemplary transmission mode corresponding to the hybrid type, in a communication system, in accordance with a further embodiment of the disclosed technique.

In a transmission scheme according to the disclosed technique, a transmission mode may facilitate a trade-off between the power consumption of the transmitters, the bit-rate and complexity. At transmission mode facilitating such a trade-off corresponds to the hybrid type. Reference is now made to FIG. 7, which is a schematic illustration of a transmission scheme to corresponding to an exemplary transmission mode corresponding to the hybrid type, generally referenced 200, in a communication system, in accordance with a further embodiment of the disclosed technique. The transmission scheme depicted in FIG. 7 exemplifies a trade-off between power consumption and transmission bit-rate for M links. FIG. 7 depicts a TDD frame 202, partitioned into a downlink time-period 204 and an uplink-time period 206 in which M users are transmitting over M links and where the transmission durations are different for each user. Accordingly, the M links are ordered according to the transmission durations thereof.

In transmission scheme 200, the downlink time-period is partitioned into two precoding intervals $208_1$ and $208_2$, each associated with a respective active group of links. The first M−2 links are the first group of active links associated with precoding interval $208_1$ and a demarcation point is determined at the end of precoding interval $208_1$ (i.e., according to the link exhibiting the longest data transmission duration of the first M−2 links). Link M−1 and link M are the second group of active links associated with precoding interval $208_2$. A first precoder is determined for the first group of active links during precoding interval $208_1$ and a second precoder is determined for the second group of links during precoding interval $208_2$. The dimensions of the first precoding matrix is M×M and the dimensions of the second precoding matrix is 2×2.

All the links transmit during precoding interval $208_1$. Each link in the first group continues to transmit a residual cancellation signal, after transmitting the payload data thereof, until the end of precoding interval $208_1$ (i.e., the demarcation point) employing the first precoder. After the demarcation point, the first M−2 transmitters turn-off. Links M−1 and M continue to transmit the payload data thereof employing the second precoder during precoding interval $208_2$. Link M−1 continues to transmit a residual cancellation signal after the end of the data transmission thereof until link M finishes transmitting the data thereof. In the example set forth in FIG. 7, M−2 links seize their transmission before the end of the downlink transmission period, while only the other two links (i.e., link M−1 and link M) continue transmitting, substantially during the entire downlink transmission period. Turning off the transmitters (i.e., at least the transmitting ports) before the last link finishes the data transmission thereof results in substantial power savings. It is also noted that in the example set forth in FIG. 7, link M−2 turns-off after precoding interval $208_1$ though there may still be data in the data queue associated therewith. In the example set forth in FIG. 7, the storage requirements requires storing only additional 4 parameters for each sub-carrier of the second precoder. According to another example, a precoder is determined for all M−1 links. The M−1 transceivers shut down after the link with the second longest transmission period (i.e., link M−1 in FIG. 7) ceases to transmit and only link M continues to transmit the data respective thereof. In such a scheme only one precoder is determined however power saving is still achieved by shutting down the transceivers prior to the end of the transmission of the link with the longest transmission duration.

Figure 8:
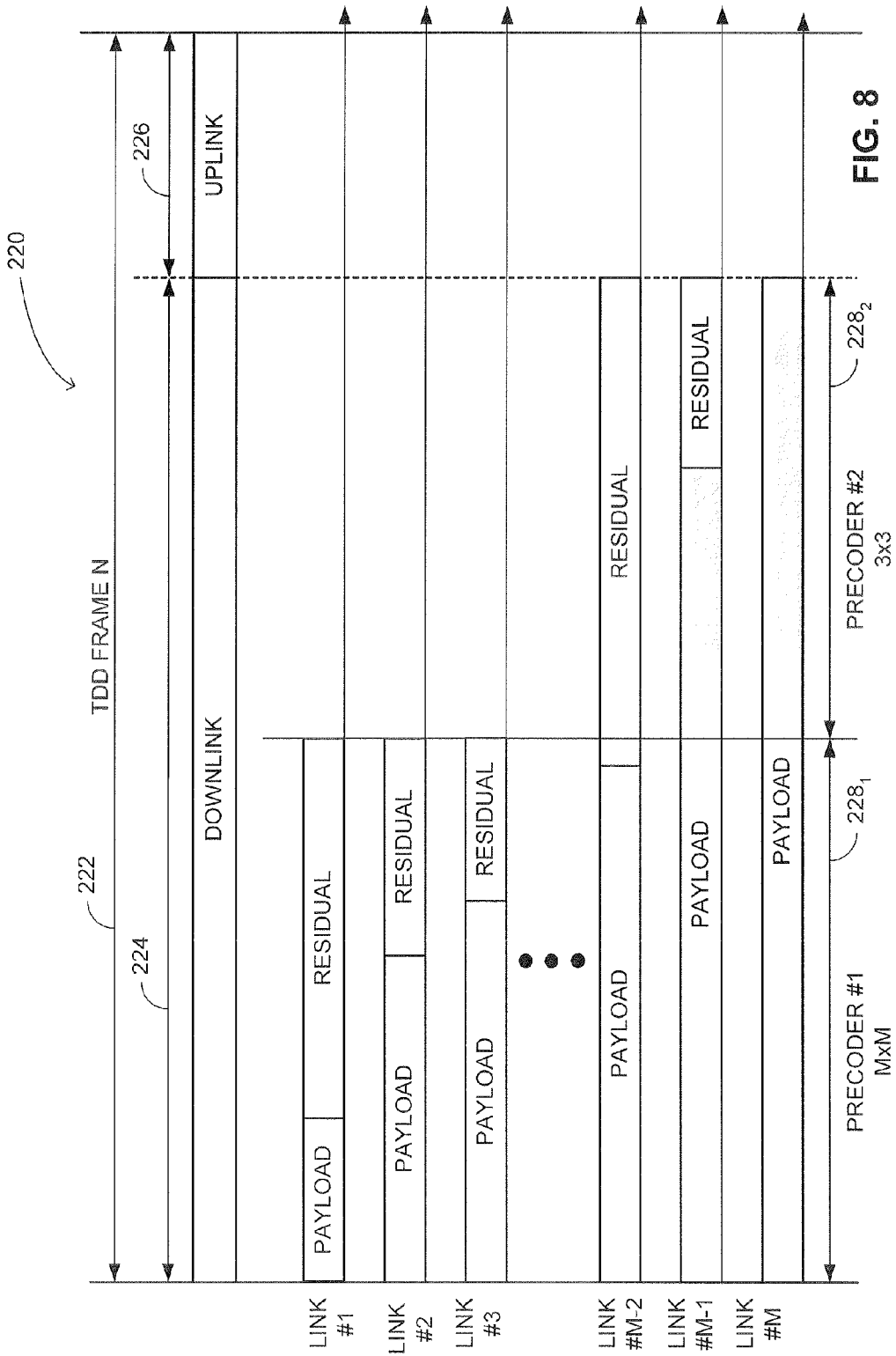
FIG. 8 is a schematic illustration of a transmission scheme corresponding to another exemplary transmission mode corresponding to the hybrid type, in accordance with another embodiment of the disclosed technique.

Reference is now made to FIG. 8, which is a schematic illustration of a transmission scheme corresponding to another exemplary transmission mode corresponding to the hybrid type, generally referenced 220, in accordance with another embodiment of the disclosed technique. The transmission scheme depicted in FIG. 8 exemplifies a trade-off between power consumption and transmission bit-rate for M links. FIG. 8 depicts a TDD frame 222, partitioned into a downlink time-period 224 and an uplink-time period 226 in which M users are transmitting over M links and where the transmission durations are different for each user. Accordingly, the M links are ordered according to the transmission durations thereof.

In transmission scheme 220, the downlink time-period is partitioned into two precoding intervals $228_1$ and $228_2$, each associated with a respective active group of links. The first M−3 links are the first group of active links associated with first precoding interval $228_1$ and a demarcation point is determined at the end of precoding interval $228_1$ (i.e., according to the link exhibiting the longest data transmission duration of the first M−3 links). Link M−2, link M−1 and link M are the second group of active links associated with second precoding interval $228_2$. A first precoder is determined for the first group of active links during precoding interval $228_1$ and a second precoder is determined for the second group of active links during precoding interval $228_2$. The dimensions of the first precoding matrix is M×M and the dimensions of the second precoding matrix is 3×3.

All the links transmit during precoding interval $228_1$. The transceivers in the first active group continues to transmit a residual cancellation signal after transmitting the payload data thereof, until the end of time-period $228_1$ (i.e., the demarcation point) employing the first precoder. After the demarcation point, the first M−3 transmitters turn-off. In transmission scheme 220, link M−2 is determined to be a part of the second active group of links even though the transmission duration of the payload data thereof is shorter than precoding interval $228_1$. Thus, link M−2 continues to transmit residual cancellation signal and links M−1 and M continue to transmit the payload data thereof employing the second precoder during the second preceding interval $228_2$. Link M−1 continues to transmit a residual cancellation signal after the end of the data transmission thereof until link M finishes transmitting the data thereof.

In general, in transmission modes corresponding to either the hybrid type or the continuous type, links may transmit a residual cancellation signal when the downlink data transmission period does not overlap the precoding interval associated with the respective active group of links. For example, with reference to FIG. 8, link 1 may first transmit residual cancellation signal and then transmit the payload data during the respective precoding interval thereof. As a further example, link 1 may start transmitting a residual cancellation signal, then transmit the payload data thereof, and continue to transmit the a residual cancellation signal after the end of the respective payload data transmission. In transmission scheme 220, M−3 links seize their transmission before the end of the downlink transmission period, while only the other three links (i.e., link M−2, link M−1 and link M) continue transmitting, substantially during the entire downlink transmission period. Turning off the transmitters before the last link finishes the data transmission thereof results in substantial power savings.

Figure 9:
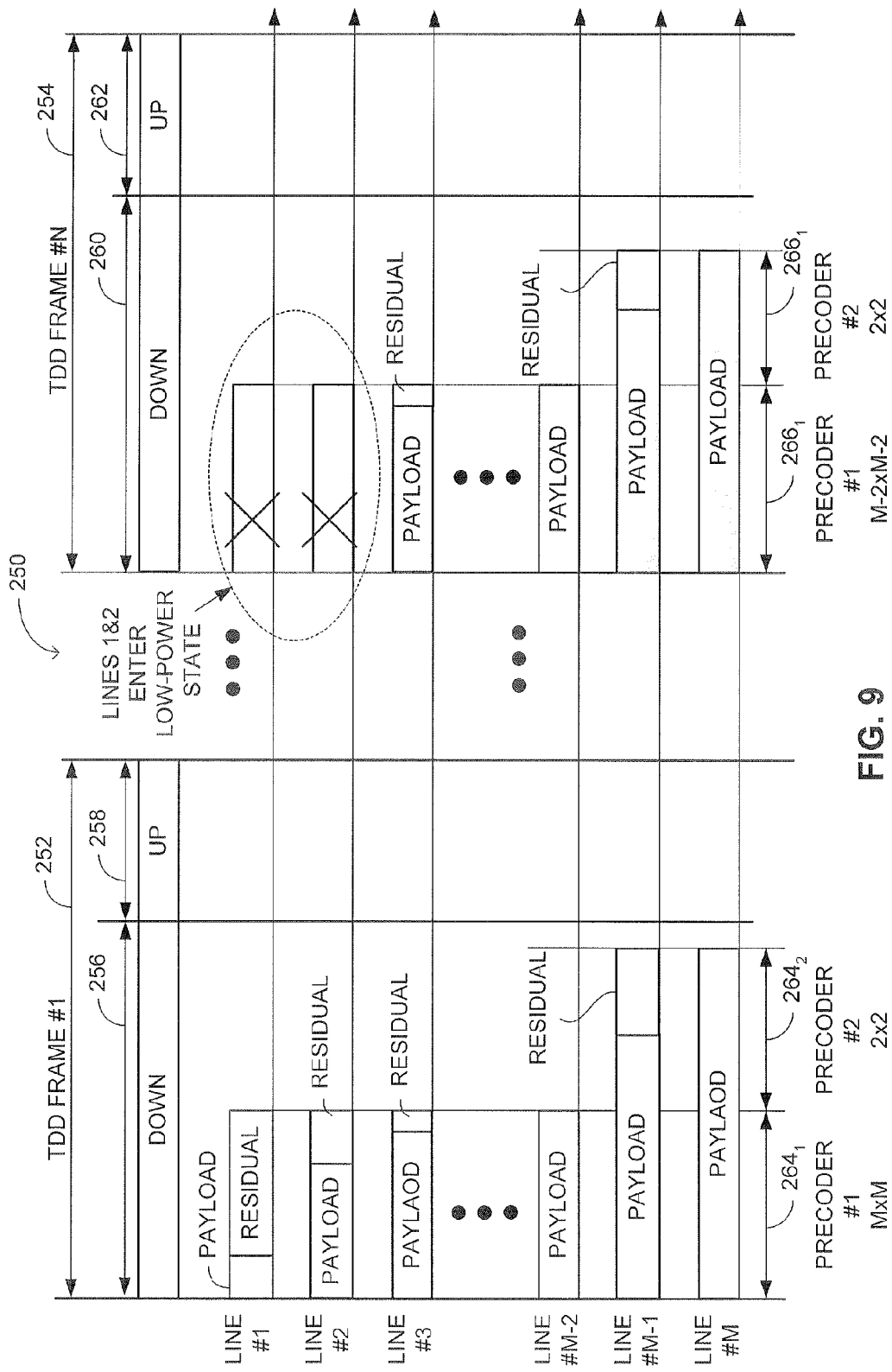
FIG. 9 which is a schematic illustration of a vectored transmission scheme in a multi-user TDD communications system, in accordance with a further embodiment of the disclosed technique.

Reference is now made to FIG. 9, which is a schematic illustration of a transmission scheme in a multi-user TDD communications system, generally referenced 250, in accordance with a further embodiment of the disclosed technique. Transmission scheme 250 relates to operation in low power mode. FIG. 9 depicts two TDD frames 252 and 254. Each one of frames 252 and 254 is, partitioned into a downlink time-period and an uplink-time period. Frame 252 is partitioned into downlink time-period 256 and uplink-time period 258. Frame 254 is partitioned into downlink time-period 260 and uplink-time period 262. In transmission scheme 250, M users are transmitting over M links and the transmission durations are different for each user.

During downlink time-period 256 of frame 252, all the links transmit during time-period $264_1$. Each link in the first group continues to transmit a residual cancellation signal, after transmitting the payload data thereof, until the end of precoding interval $264_1$ (i.e., the demarcation point) employing a first precoder where the precoding matrices are of size M×M. After the demarcation point, the first M−2 transmitters turn-off. Links M−1 and M continue to transmit the data thereof employing a second precoder where the precoding matrices are of size 2×2. Link M−1 continues to transmit a residual cancellation signal after the end of the data transmission thereof until Link M finishes transmitting the data thereof. During frame 254, transmitters #1 and #2 have no data to transmit. Consequently, during precoding interval $266_1$, transmitters #1 and #2 may turn off (i.e., turning off at least the respective transmitting ports thereof since greater power saving is achieved when a transmitting port is not active at all along a TDD-frame) and the M−2 other transmitters shall employ a precoder where the precoding matrices are of size M−2×M−2. After the demarcation point at the end of precoding interval $266_1$, the first M−4 transmitters turn off. During precoding interval $266_2$ Links M−1 and M continue to transmit the data thereof employing a second precoder where the precoding matrices are of size 2×2. Consequently, power consumption is reduced without effecting performances.

In general, there are two low-power modes. The first mode is a synchronized mode and the second mode is the un-synchronized mode. In the synchronized mode, a transmitter that does not have data to transmit, does not turn-off completely, but rather continue to transmit synchronization symbols which are used for determining the channel characteristics (e.g., frequency response, far and near end cross-talk) and consequently for determining the different precoder matrices. Consequently, when that transmitter is required to transmit data again, there is no need to re-acquire the channel but only to determine the precoder. In this synchronized mode, the time period for transition to and from the low power state is on the order of tens of milliseconds. In the un-synchronized mode, a transmitter that has no data to transmit turns off completely and does not transmit anything. In this mode, when the transmitter is required to transmit data again, the channel characteristics need to be re-estimated before determining the precoder. Thus, the transition time to the active state is on the order of one second. However, the savings in power consumption is greater than in the synchronous mode.

Figure 10:
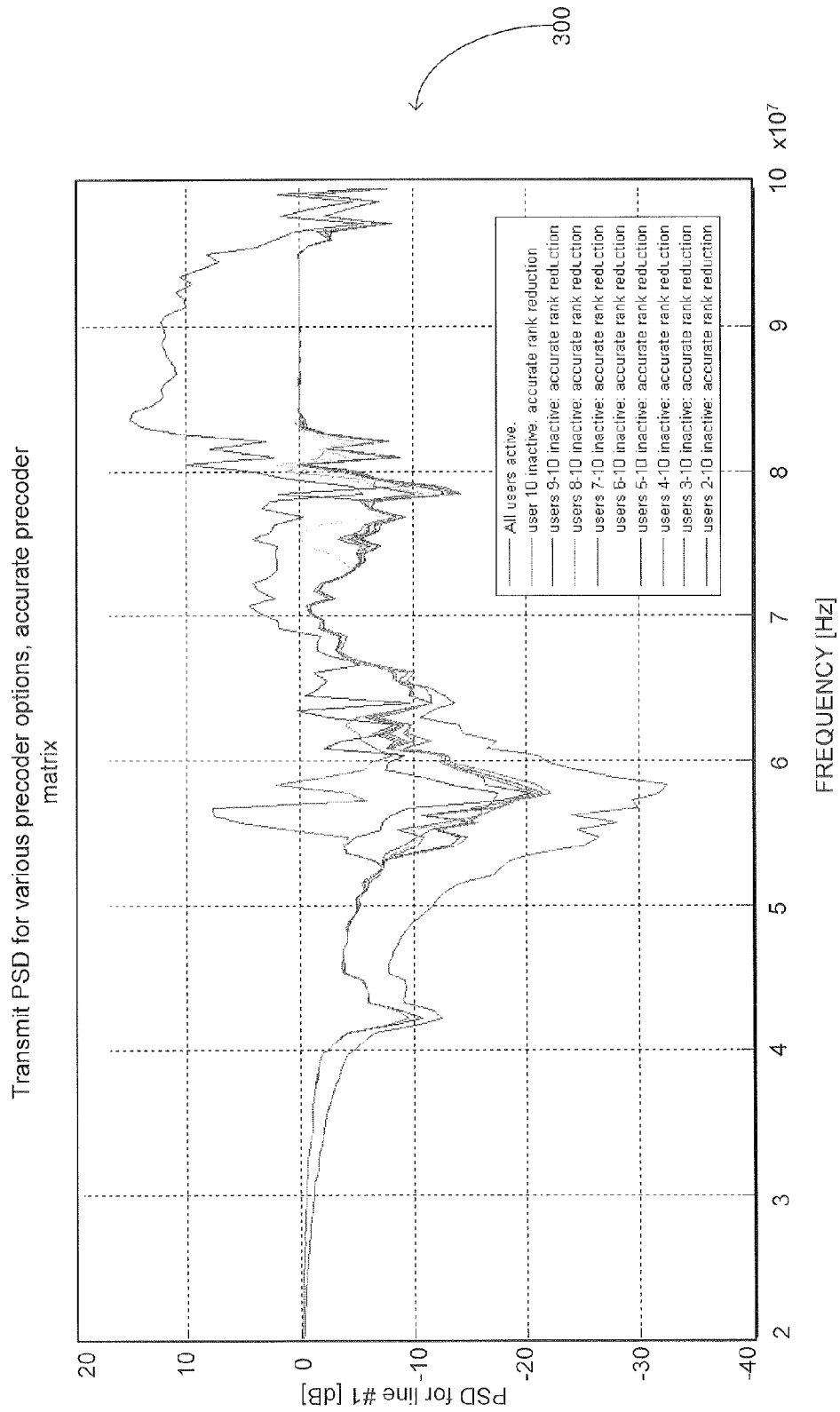
FIG. 10 is a schematic illustration of a graph, which depicts the transmit Power Spectral Density (PSD) versus transmission frequency, for various precoders, in accordance with another embodiment of the disclosed technique.

Reference is now made to FIG. 10, which is a schematic illustration of a graph, generally referenced 300, which depicts the transmit Power Spectral Density (PSD) versus transmission frequency, for various precoders, in accordance with another embodiment of the disclosed technique. FIG. 10 depicts a plurality of plots of the transmit PSD for various precoder options where the lines indicate a "turned off" mode. The analysis relates to a Swisscom quad binder. Initially all the lines are active and calculated the appropriate precoder for this case. Then one of the lines is turned off and precoder is recalculated with no approximations. This new precoder is the optimal precoder and is also transparent to the customer premise equipment (CPE) receiver (i.e., keeps the same channel gain).

As depicted in FIG. 10, once a transmitter is turned off, and assuming the receivers keeps the same channel gains, the transmit power of other transmitters may have to be increased. The result may be a violation of PSD constraints, which in the example set forth in FIG. 10, may exceed, in some cases, 10 dB. Since the PSD constraints have to be complied with, the result is twofold. First Gain scaling has to be used at the DP transmitter side to comply with the PSD constraints. Consequently, the use of the new precoder is thus not transparent to the CPE, since the gain scaling factor has to be communicated to the CPE. Second, applying gain scaling will reduce performance since for at least some of the sub-carriers the received signal to noise ratio will be lower, so a smaller constellation may be required (i.e., different bit-loading). As depicted in FIG. 10, turning off a transmitter in one link may impact the performance of other links. In the some cases, such as depicted in FIG. 3 above, the attenuation in the cross-talk channel is lower than the attenuation direct channel. For example, with reference to FIG. 3, the direct link attenuation is 20 dB while the cross-talk channel attenuating is 10 dB.

As described above, a communications system according to the disclosed technique (e.g., system 300 in FIG. 11 below) employs Discrete Multi-Tone (DMT) transmission in which the transmission bandwidth is divided into a plurality of sub-carriers. Due to the variation of the channel characteristics and noise over frequency, each sub-carrier is further associated with a respective modulation constellation such as 64 Quadrature Amplitude Modulation (QAM), 256 QAM and the like. The respective modulation constellation of each sub-channel is determined according to the signal to noise ratio (SNR) of that sub-channel, required bit-rate, power constraints, CRC errors (i.e., error events) and the like. The allocation of the constellations to the different sub-carriers (i.e., the number of bits assigned to each symbol of each sub-carrier) is specified in a Bit Loading Table (BLT).

In general, a BLT is determined for each link and for each frame or super-frame. As mentioned above, turning off a transmitter changes the channel characteristics and consequently the achievable bit-rate. When operating according to a transmission mode of a discontinuous type or hybrid type, the system according to the disclosed technique may determine a single BLT, for each link, for the entire frame or super-frame based on the worst case conditions. However, determining a BLT for the entire frame or super-frame based on the worst case conditions is not optimal in terms of the achievable bit-rate for the determined transmission mode. Thus, alternatively, the system according to the disclosed technique may determine a BLT for each link and for each active group of transmitters, according to the channel characteristics associated with that active group. Once a transmitter is turned off, the channel characteristics over transmit frequency spectrum may change. Employing a previously determined BLT, after turning off a transmitter, may result in degradation in performance. Thus, to maintain optimal performance, when a transmitter or transmitters are turned off, a new BLT may be required for remaining active transmitters since the channel characteristics have changed.

Changing a precoder may result in a change in the precoding gains and consequently in the overall gain (i.e., transmitter plus channel gains). Thus, when a precoder is changed, a gain level mismatch may occur between the gain parameters employed by the transmitter and gain parameters employed by the respective receiver. The change in the overall gain may further result in the transmitted signal frequency spectrum to violate a regulatory power spectral density (PSD) mask (e.g., PSD constraints, PSD values) or exceed above some upper limit (e.g., system design upper limit, component upper limit). The PSD mask defines the maximum allowed transmit signal level per sub-carrier within the transmit frequency spectrum.

To prevent the PSD from exceeding some upper limit, the transmitted signal frequency spectrum may need to be normalized. Since there are k precoder matrices determined for each of the k sub-carrier, each sub-carrier needs to be associated with a power normalization (scaling) factor. Furthermore, this scaling factor hast to be communicated to the receiver to coordinate (e.g., equalize, normalize) the receiver gains with the transmitter gains. To that end, the link between the receiver and the transmitter is used for conveying gain corrections by employing, for example, the Robust Management Channel (RMC) available in each TDD frame or a dedicated communication protocol or both.

Figure 11:
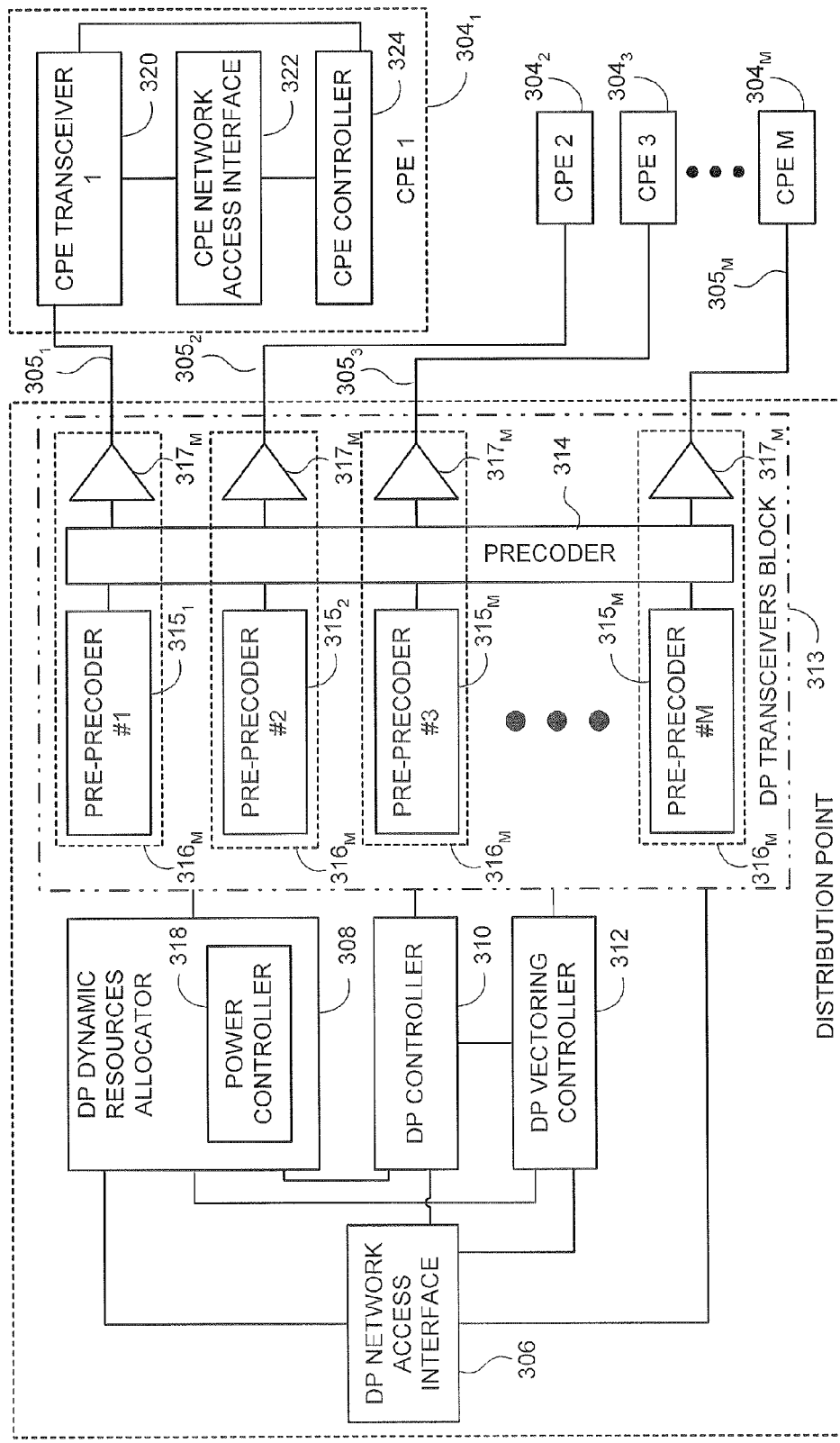
FIG. 11 is a schematic illustration of a communication system, constructed and operative in accordance with a further embodiment of the disclosed technique.

Reference is now made to FIG. 11 which is a schematic illustration of a communication system, generally referenced 300, constructed and operative in accordance with a further embodiment of the disclosed technique. System 300 includes a distribution point (DP) 302 and a plurality of Customer Premise Equipment (CPEs) $304_1$, $304_2$, $304_3$, ..., $304_M$. DP 302 includes a DP network interface 306, a DP dynamic resources allocator (DRA) 308, a DP controller 310, a DP vectoring controller 312 and a DP transceivers block 313. DP transceivers block 313 includes a precoder 314 and a plurality of DP transceivers $316_1$, $316_2$, $316_3$, ..., $316_M$. Each one of transceivers $316_1$, $316_2$, $316_3$, ..., $316_M$ includes a respective pre-precoder $315_1$, $315_2$, $315_3$, ..., $315_M$, a respective transmitting port $317_1$, $317_2$, $317_3$, ..., $317_M$ and a respective receiver (not shown). DP dynamic resources allocator 308 includes a power controller 318. Each one or CPEs $304_1$, $304_2$, $304_3$, ..., $304_M$, such as CPE $304_1$ includes a respective CPE transceiver 320, a respective CPE network access controller 322 and a respective CPE controller. Each one of DP transceivers $316_1$, $316_2$, $316_3$, ..., $316_M$ and the CPE transceiver 320 of a respective one of CPEs $304_1$, $304_2$, $304_3$, ..., $304_M$ includes a transmitter (not shown) and a receiver (also not shown).

Each one of transmitting ports $317_1$, $317_2$, $317_3$, ..., $317_M$ is coupled with a respective CPE transceiver 320 of a respective one of one of CPEs $304_1$, $304_2$, $304_3$, ..., $304_M$ defining transceiver pairs. The transmitting ports $317_1$, $317_2$, $317_3$, ..., $317_M$ and the respective receivers of each CPE transceiver 320 of a respective one of CPEs $304_1$, $304_2$, $304_3$, ..., $304_M$ coupled therewith, define a downlink. Furthermore, the receivers (not shown) of DP transceivers $316_1$, $316_2$, $316_3$, ..., $316_M$ and the respective transmitters of each CPE transceiver 320 of a respective one of CPEs $304_1$, $304_2$, $304_3$, ..., $304_M$ coupled therewith, define an uplink. Accordingly, each one of DP transceivers $316_1$, $316_2$, $316_3$, ..., $316_M$ forms a respective link $305_1$, $305_2$, $305_3$, ..., $305_M$ with a respective CPE transceiver 320 of a respective one of one of CPEs $304_1$, $304_2$, $304_3$, ..., $304_M$. The term 'link' relates herein to two devices communicating with each other (i.e., transmitting data to each other and receiving data from each other).

DP Controller 310 is coupled with DP network access interface 306, DP dynamic resources allocator 308, DP vectoring controller 312 and with each one of transceivers $316_1$, $316_2$, $316_3$, ..., $316_M$ (depicted in FIG. 11 as coupling with transceiver block 313). DP Dynamic resources allocator 308 is further coupled with network access interface 306, DP vectoring controller and with each one of transceivers $316_1$, $316_2$, $316_3$, ..., $316_M$ (also depicted in FIG. 11 as coupling with transceiver block 313). DP Vectoring controller 312 is further coupled with network access interface 306 and with each one of transceivers $316_1$, $316_2$, $316_3$, ..., $316_M$ (also depicted in FIG. 11 as coupling with transceiver block 313). Network access interface 306 is further coupled with a network (e.g., POTS or Internet—not shown). The inputs of precoder 314 are coupled with pre-precoders $315_1$, $315_2$, $315_3$, ..., $315_M$. The outputs of precoder 314 are coupled with transmitting ports $317_1$, $317_2$, $317_3$, ..., $317_M$.

CPE controller 324 is coupled with CPE transceiver 320, CPE and with network access interface 322. CPE network access interface 322 is further coupled with CPE transceiver 320 and with a customer premise network (not shown). DP Network interface 306 provides each one of DP transceivers $316_1$, $316_2$, $316_3$, ..., $316_M$ the respective downstream data destined to the respective one of CPEs $304_1$, $304_2$, $304_3$, ..., $304_M$. DP Network interface 306 further receives from each one of DP transceivers $316_1$, $316_2$, $316_3$, ..., $316_M$ the upstream data from the respective one of CPEs $304_1$, $304_2$, $304_3$, ..., $304_M$. DP Network interface 306 may include buffers (not shown) for temporarily storing downstream and upstream data when the rate of the data received exceeds the rate of the transmitted data. DP network interface 306 further provides DP dynamic resources allocator 308 with data queues status reports relating to the amount of data to be downlink transmitted.

DP Controller 312 provides DP network interface 306, DP dynamic resources allocator 308, DP vectoring controller 312 and each one of DP transceivers $316_1$, $316_2$, $316_3$, ..., $316_M$ with extrinsic parameters relating to the operation of DP 302. DP Controller 312 may receive updates relating to these extrinsic parameters either from the network via DP network interface 306 or via a user interface (not shown). The term 'extrinsic parameters' relates herein to parameters which are not determined by DP 302 and include information relating to the configuration of thereof. For example, DP controller 310 provides dynamic resource allocator 308 with the maximum data rate or the guaranteed bit-rate specified in the service level agreement of each user associated with CPEs $304_1$, $304_2$, $304_3$, ..., $304_M$. Dynamic resources allocator 308 may use this information when determining the allocated transmission opportunities for each one of CPEs $304_1$, $304_2$, $304_3$, ..., $304_M$ (e.g., the uplink or downlink time slots or the sub each allocated for each CPE). DP controller 310 may also provide dynamic resources allocator 308 with the maximum allowed operating temperatures of DP 302 or of the components thereof or with ambient temperature threshold and component temperature thresholds, to allow power controller 318 to determine the required power dissipation or maximum power dissipation of each one of transceivers $316_1$, $316_2$, $316_3$, ..., $316_M$ so as to maintain the temperature below a determined temperature threshold.

DP Dynamic resources allocator 308 determines one or more active group of transmitters. This active group or groups define transmission modes. The transmission mode or modes may correspond to the continuous type, the discontinuous type or the hybrid type as described above in conjunction with FIGS. 5, 6, 7, 8 and 9. DP Dynamic resources allocator 308 provides the determined transmission mode or modes to DP vectoring controller 312. For each transmission mode, DP vectoring controller 312 determines a precoder (i.e., the precoding matrices) corresponding to each active group in the downlink and respective gain scaling factors. Furthermore, for each transmission mode, DP vectoring controller 312 further determines at least one BLT for each active link. In general the number of BLTs may be equal or smaller than the number of active groups. In other words, for example, each active group may be associated with a BLT or all the active groups may be associated with the same BLT. As a further alternative, several of the active groups may be associated with the same BLT. DP vectoring controller 312 further determines the expected bit-rate for each active group according to the determined BLTs and provides the expected respective bit-rate for each active group to DP dynamic resources allocator 308. DP vectoring controller 312 determines the precoders gain scaling factors and BLTs according to backchannel information. The backchannel information is further explained below.

For each transmission mode, DP dynamic resources allocator determines the expected power dissipation. The expected power dissipation is related to the power dissipation of the transceivers (e.g., resulting from modulation parameters, transmission power and the like). For each transmission mode (i.e., combination of active groups), DP dynamic resource allocator 308 determines a transmission plan (i.e., the allocation of transmission opportunities). The transmission plan is determined according at least one data transmission information, power dissipation information, the expected respective power dissipation, the expected respective bit-rate associate with the active group or groups and according to service level agreement. The transmission plan defines demarcation points (i.e., the points in time at which selected transmitters shall turn-off) according to the active groups, which define the partition of the data frame into time-segments. In other words, the transmission plan defines the transmission duration of each transceiver. Each time segment terminates no earlier than the end of a respective downlink data transmission period of at least one of the transceivers the respective active group. DP dynamic resources allocator 308 determines the transmission plan at least according to data transmission information. Data transmission information (explained further below) relates at least to the amount of data to be transmitted by each one of transceivers $316_1$, $316_2$, $316_3$, ..., $316_M$ (also referred to as 'downlink data queues status').

The above mentioned data transmission information relates at least to downlink data queue status. The data transmission information may further include the amount of data to be transmitted in the uplink (also referred to as 'uplink data queues status') that may conveyed to DP 302 from CPEs $304_1$, $304_2$, $304_3$, . . . , $304_M$. The data transmission information may further relate to the priority of the data to be transmitted and to guaranteed bit-rate specified in the contract of each user associated with CPEs $304_1$, $304_2$, $304_3$, . . . , $304_M$. The data transmission information may also relate to the capacity of each one of links $305_1$, $305_2$, $305_3$, . . . , $305_M$. The data transmission information may also include information relating to previously used transmission opportunities by each of transceivers $316_1$, $316_2$, $316_3$, . . . , $316_M$ for the downlink and by each of CPEs $304_1$, $304_2$, $304_3$, . . . , $304_M$ for the uplink, minimum amount of data each of transceivers $316_1$, $316_2$, $316_3$, . . . , $316_M$ and each of CPEs $304_1$, $304_2$, $304_3$, . . . , $304_M$ is require to transmit (i.e., may be smaller or larger than the stored amount of data to be transmitted). The term 'amount of data' refers to herein to the number of units of information (e.g., bits, bytes or symbols). DP dynamic resources allocator 308 determined the data transmission information according to received, data queue status reports, bandwidth reports as well as the extrinsic parameters from DP controller 310. The data queue status reports include information relating to the required amount of data to be transmitted by each one of transceivers $316_1$, $316_2$, $316_3$, . . . , $316_M$ in the downlink and by each of CPEs $304_1$, $304_2$, $304_3$, . . . , $304_M$ in the uplink. Each of CPEs $304_1$, $304_2$, $304_3$, . . . , $304_M$ may transmit the uplink data queues status thereof to DP 302 periodically or upon request from DP dynamic resources allocator 308. The bandwidth reports may include information relating to the previously used transmission opportunities by each of transceivers $316_1$, $316_2$, $316_3$, . . . , $316_M$ for the downlink, and by each of CPEs $304_1$, $304_2$, $304_3$, . . . , $304_M$ for the uplink. The bandwidth reports may also include information relating to the minimum amount of data each of transceivers $316_1$, $316_2$, $316_3$, . . . , $316_M$ and each of CPEs $304_1$, $304_2$, $304_3$, . . . , $304_M$ is require to transmit (i.e., may be smaller or larger than the stored amount of data to be transmitted).

The above mentioned backchannel information according to which DP vectoring controller 312 determines the precoder and gain scaling factors for each transmission mode or modes includes information received from each one of CPEs $304_1$ $304_2$, $304_3$, . . . , $304_M$, which relates to channel characteristics the transmission channel. These characteristics relate, for example, to the downlink Far End Cross-talk (FEXT) measurements, SNR and signal attenuation. The parameters may be determined directly by each one of CPEs $304_1$ $304_2$, $304_3$, . . . , $304_M$ and communicated to DP 302, according to probing signals transmitted by DP vectoring controller 312 via each one of transceivers $316_1$, $316_2$, $316_3$, . . . , $316_M$ to the respective one of CPEs $304_1$ $304_2$, $304_3$, . . . , $304_M$. Alternatively, the above mention channel characteristics may be determined the DP 302, for example, according to information relating to errors, received from the CPE (which are determined by the CPE according to the received probing signals). Since the probing signal transmitted by each one of transceivers $316_1$, $316_2$, $316_3$, . . . , $316_M$ are known to CPEs $304_1$ $304_2$, $304_3$, . . . , $304_M$, each one of CPEs $304_1$ $304_2$, $304_3$, . . . , $304_M$ can evaluate the channel characteristics and transmits the determined characteristics to DP 302. DP vectoring controller 312 employs the channel characteristics to determine the channel response matrices (i.e., a matrix for each sub-channel). Consequently, DP vectoring controller 312 can determine the effect of turning off transceivers $316_1$, $316_2$, $316_3$, . . . , $316_M$ as well as turning off transceiver 120 CPEs $304_1$ $304_2$, $304_3$, . . . , $304_M$ of on the channel response matrix. Thus, DP vectoring controller 312 can determine the effect of turning off transceivers $316_1$, $316_2$, $316_3$, . . . , $316_M$ on the precoder (i.e., on the precoder matrices).

The power dissipation information of DP 302 mentioned above includes at least the maximum allowed power dissipation of DP 302. For example, dynamic resources allocator 308 receives information relating to the ambient temperature of DP 302 or of components (e.g., chips) within DP 302 from various sensors (not show) inside DP 302. Furthermore, DP dynamic resources allocator 308 may receive additional information relating to the actual power dissipation of DP 302 (e.g., from current and voltage sensors—both not shown). The power dissipation information received by dynamic resources allocator 308 may further include information relating required operating temperatures of DP 302 or of the components thereof or relating to the ambient temperature threshold and component temperature thresholds. Alternatively or additionally, Dynamic resources allocator 308 may further receive from DP controller 310 information relating to the allowed energy or power dissipation of DP 302. Power controller 318 employs this information when selecting a transmission mode so as to meet either power dissipation requirements, temperature requirements or both. For example, these temperature requirements include maintaining the temperature of DP 302 below a determined temperature threshold (i.e., either the temperature within DP 302 or the temperature of components of DP 302). The power requirements may be, for example, a power dissipation threshold of DP 302.

When, for example, at least one of the links is required to transmit large amount of information with high priority, DP Dynamic resources allocator 308 may select a continuous mode transmission mode maximizing the transmission bit-rate such as described above in conjunction with FIG. 6. As a further example, when all of the links are required to transmit low amounts of information with low priority, DP Dynamic resources allocator 308 may select a discontinuous mode, minimizing the transmission power such as described above in conjunction with FIG. 5. According to another example, some of the links are required to transmit large amounts of information with low priority, DP Dynamic resources allocator 308 shall select a hybrid transmission mode which trades-off between transmission power and bit-rate such as described above in conjunction with FIG. 7.

Each one of DP transceivers $316_1$, $316_2$, $316_3$, . . . , $316_M$ transmits data to CPE transceiver 320 of the respective one of CPEs $304_1$, $304_2$, $304_3$, . . . , $304_M$. When transmitting downstream data, each one of pre-precoders $315_1$, $315_2$, $315_3$, . . . , $315_M$ performs transmission operation such as framing and Forward Error Correction (FEC). Precoder 314 multiples each data stream corresponding to each sub-carrier respective of each transceiver $316_1$, $316_2$, $316_3$, . . . , $316_M$, by the respective precoding matrix corresponding to each sub-carrier. Each one of transmitting ports $317_1$, $317_2$, $317_3$, . . . , $317_M$, modulates the respective output of precoder 314 by employing the Inverse Fourier Transform (IFT) and transmits the modulated signal to the respective one of CPEs $304_1$, $304_2$, $304_3$, . . . , $304_M$. It is noted that, for each DMT sub-carrier, precoding is performed according to the respective precoder matrix corresponding to the current active group of transceiver. When receiving upstream data, each one of transceivers $316_1$, $316_2$, $316_3$, . . . , $316_M$ performs reception operations such as filtering, demodulation, cross-talk cancellation, FEC decoding. All transceivers $316_1$, $316_2$, $316_3$, . . . , $316_M$ simultaneously transmit data frames starting at the same time and over the transmission bandwidth.

CPE Controller 324 provides CPE network interface 322, CPE transceivers 320 with extrinsic parameters relating to the operation of CPE 304. DP Controller 312 may receive updates relating to these extrinsic parameters either from the network via CPE network interface 306 or via a management interface (not shown). These extrinsic parameters are, for example, the guaranteed and maximum uplink data rate of the respective CPE. CPE Network interface controller 322 receives from the user device or devices (e.g., computers, routers, smartphones—all not shown) upstream data and provides this upstream data to transceiver 320. CPE Network interface 322 receives from transceiver 320 downstream data and provides this downstream data to the user device or devices. CPE Network interface 306 may include buffers (not shown) for temporarily storing downstream and upstream data when the rate of the data received exceeds the rate of the transmitted data (i.e., either toward the DP or the network). When transmitting upstream data, CPE transceiver 320 performs transmission operations such as framing, FEC, encoding and modulation. When receiving downstream data, transceiver 320 performs reception operations such as filtering, demodulation and FEC decoding.

According to another embodiment of the disclosed technique, and still referring to FIG. 11, DP vectoring controller 308 determines the bit-rate for each link in each one or more active groups, according to one or more BLT associated with the one or more active groups. DP dynamic resources allocator 308 determines a transmission plan according to at least one of the bit-rate for each link in each one or more active group (i.e., as determined by DP vectoring controller 308) and power dissipation information, data transmission information, service level agreement or any combination thereof. The transmission plan, in fact, comprises a combination of active groups, each one with the respective BLT per link thereof where the demarcation points between the active groups are parameters to be optimized to facilitate the above discussed tradeoff between power and performance.

Figure 12:
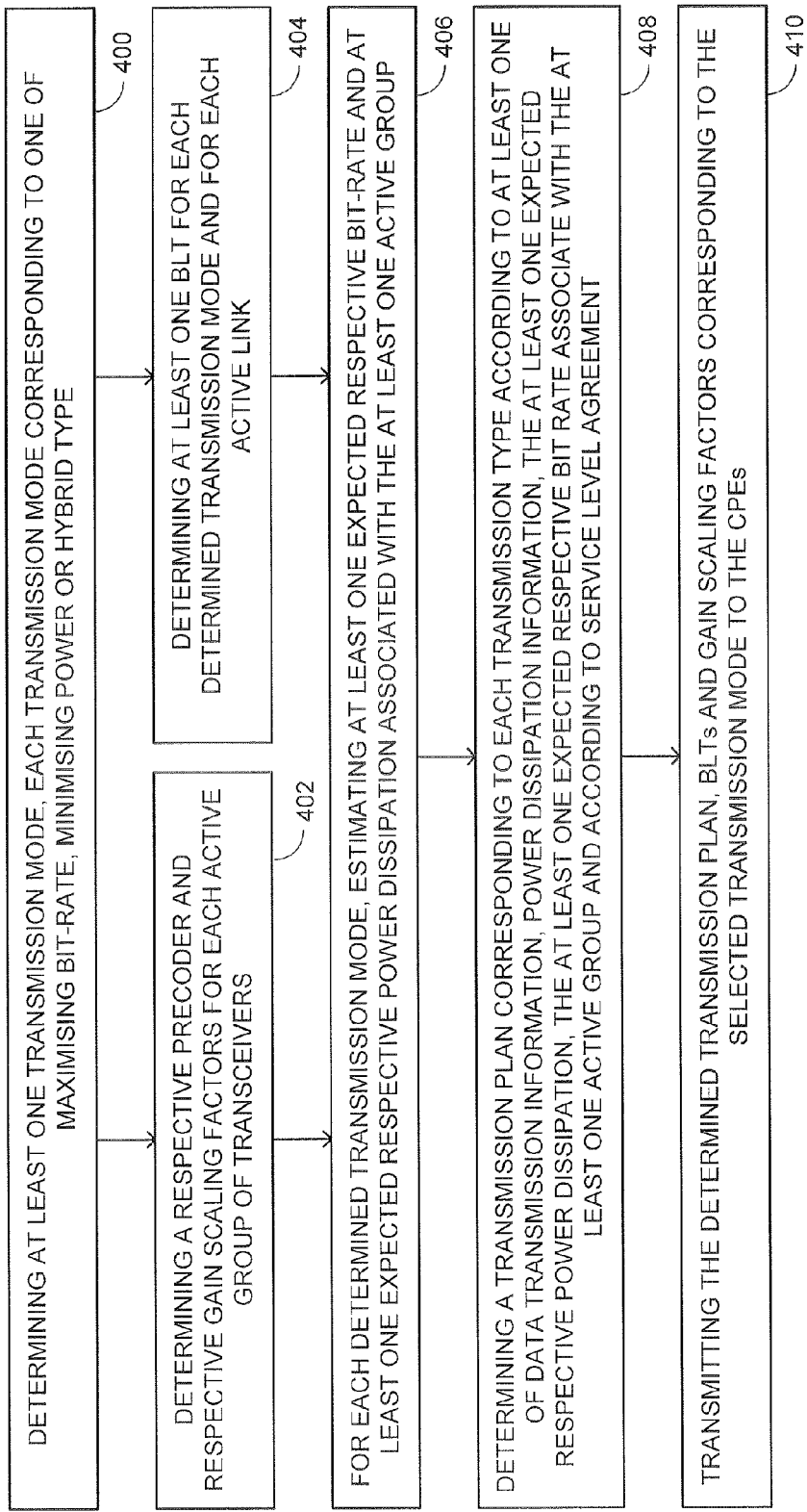
FIG. 12 is a schematic illustration of a method for vectored transmission in accordance with another embodiment of the disclosed technique.

Reference is now made to FIG. 12 which is a schematic illustration of a method for vectored transmission in accordance with another embodiment of the disclosed technique. In procedure 400, at least one transmission mode is determined. The transmission mode is one of continuous type, discontinuous type or hybrid type as described above in conjunction with FIGS. 5, 6, 7, 8 and 9. Each of the at least one transmission mode is defined by a respective active group or a combination of active groups of transmitters. The transmission mode is determined for each frame or for time to time as explained above. With reference to FIG. 11, DP dynamic resources allocator determines at least one transmission mode.

In procedure 402, a respective precoder and respective gain scaling factors are determined for each active group of transceivers. The precoder includes a precoding matrix for each sub-carrier and the gain scaling factor is determined for each sub-carrier in the downlink. With reference to FIG. 11, DP vectoring controller 312 determines a respective precoder and respective gain scaling factors for each active group of transmitters in each determined transmission mode.

In procedure 404, at least one BLT is determined for each determined transmission mode and for each active link. As mentioned above, BLTs is determined according to the channel characteristics. Since turning off a transmitter may change the resulting signal to noise ratio (SNR) for a link, a new BLT may need to be determined for that link once a transmitter is turned off. It is noted that the BLTs are determined for the downlink as well as for the uplink (as further explained below). Furthermore, in general the number of BLTs may be equal or smaller from the number of active groups. In other words, each active group may be associated with a BLT or all the active groups may be associated with the same BLT. As a further alternative, several of the active groups may be associated with the same BLT. With reference to FIG. 11, DP vectoring controller 312 determines a respective BLT for each active group of transmitters in each determined transmission mode.

In procedure 406, for each determined transmission mode, at least one expected respective bit-rate and at least one expected respective power dissipation are associated with the at least one active group are estimated. (i.e., the bit rate associated with each active group in defining the transmission mode). The expected bit-rates are determined according to the determined respective BLT or BLTs. The expected power dissipation relates to the power dissipation of the transceivers (e.g., resulting from modulation parameters, transmission power and the like). With reference to FIG. 11, DP vectoring controller 312 estimates the expected respective bit-rate and DP dynamic resources allocator 308 estimates the expected respective power consumption for each determined transmission mode.

In procedure 408, a transmission plan corresponding to each transmission mode is determined according to at least one of data transmission information, power dissipation information, the at least one expected respective power dissipation, the at least one expected respective bit rate associate with the at least one active group and according to service level agreement. The transmission plan defines the transmission duration for each transceiver in each active group. The transmission plan includes the allocation of transmission opportunities for the transceivers. The transmission plan defines demarcation points (i.e., the points in time at which selected transmitters shall turn-off), which define the partition of the data frame into time-segments (i.e., precoding intervals in the downlink). Each time segment terminates no earlier than the end of a respective downlink data transmission period of at least one of the transceivers the respective active group. With reference to FIG. 11, DP dynamic resource allocator 308 determines a transmission plan corresponding to the each determined transmission mode.

In procedure 412, the determined transmission plan, BLTs and gain scaling factors corresponding to the selected transmission mode are transmitted to the CPEs. Thus, the CPEs shall be able to demodulate and scale the received signal thereby. The BLT or BLTs and the gain scaling factors are transmitted to the CPEs over a management channel. The CPE shall use these BLTs and gain scaling factors according to the determined transmission scheme. The management channel is a special communication channel (i.e., either physical or logical) dedicated for the transmission of communications control information (e.g., allocated transmission opportunities, BLTs, scaling factors, bandwidth reports and the like) between the DP and the CPEs. With reference to FIG. 11 DP transceivers $316_1$, $316_2$, $316_3$, . . . , $316_M$ transmit the determined BLT and gain scaling factors corresponding to the selected transmission mode to CPEs $304_1$, $304_2$, $304_3$, . . . , $304_M$.

Following is an example according to which a transmission mode may be determined. The following example assumes N links of equal link capacity or maximum specified bit-rate. As mentioned above, when maximizing the bit-rate all the links continue to transmit residual cancellation data until the link with the largest transmission duration ends the transmission thereof. In such a case the DP power consumption may be estimated as follows:

$$\text{Power}_{continuous} = N \cdot \max(R_1, R_2, \ldots R_N)/R_{max} \quad (5)$$

where $R_{max}$ the maximum possible bit rate achieved when all links are active and $R_1, R_2, \ldots R_N$ are the traffic demands for link.

When each transmitter turns off after transmitting the respective data thereof (i.e., minimizing power in the discontinuous mode), the DP power consumption may be estimated as follows:

$$\text{Power}_{discont} = \Sigma_{i=1}^{N} R_i / R_{discont} \quad (6)$$

where $R_{discont}$ is the available bit-rate when discontinuous operation is enabled.

Assuming that, for example, the traffic demands per frame of all the links are a fraction, a, of the traffic demand per frame of the link with the highest traffic demand, than, employing discontinuous mode saves power only when the following occurs:

$$\frac{R_{discont}}{R_{max}} > \frac{[1 + (N-1)\alpha]}{N} \quad (7)$$

Figure 13:
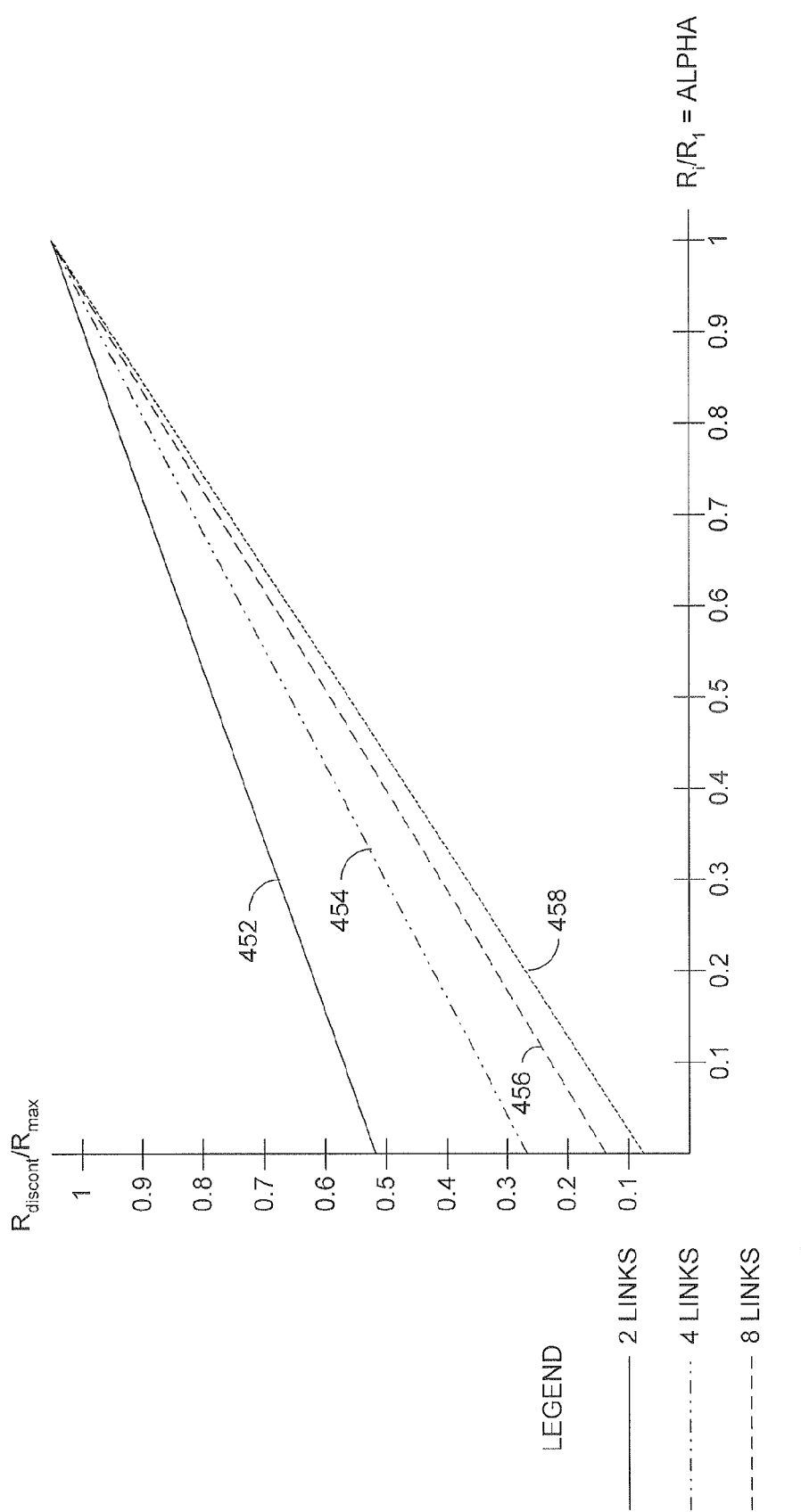
FIG. 13 is a schematic illustration of a graph, depicting a graphic representation of equation (7) for different number of links, in accordance with a further embodiment of the disclosed technique.

Reference is now made to FIG. 13 which is a schematic illustration of a graph, generally referenced 450, depicting a graphic representation of equation (7) for different number of links, in accordance with a further embodiment of the disclosed technique. Line 452 is a graphical representation of equation (7) when two links are employed (i.e., N=2). Hatched double dotted line 454 is a graphical representation of equation (7) when four links are employed (i.e., N=4). Hatched line 456 is a graphical representation of equation (7) when eight links are employed (i.e., N=8). Dotted line 458 is a graphical representation of equation (7) when sixteen links are employed (i.e., N=16). In FIG. 13 the area above each of lines 452, 454, 456 and 458 represents the values of α and $$\frac{R_{discont}}{R_{max}}$$

for which discontinuous mode results in savings of power for each respective number of links. The area below each of lines 452, 454, 456 and 458 represents the values of α and $$\frac{R_{discont}}{R_{max}}$$

for which discontinuous mode does not results in savings of power for each respective number of links. Thus, it may be concluded that discontinuous operation may results in saving power when there is substantial difference in traffic demands between the links or when there is no substantial degradation in performance when transmitters are turned off. Furthermore, discontinuous operation may save power when a large group of links are employed.

The description herein above relates to the downlink. However, the disclosed technique may be applied to the uplink as well. With referenced to FIG. 11 and as mentioned above, DP dynamic resources allocator 308 receives bandwidth reports from network interface 306 and from CPEs $304_1, 304_2, 304_3, \ldots, 304_M$ which include information relating to the required amount of data to be transmitted by each one of transceivers $316_1, 316_2, 316_3, \ldots 316_M$ and by each of CPEs $304_1, 304_2, 304_3, \ldots, 304_M$. Similar to the downlink, the transmission mode determined DP vectoring controller 312 defines the active groups of uplink transmitters. The transmission plan defines uplink demarcation points (i.e., the points in time at which selected transmitters shall turn-off), which define the partition of the uplink portion of the data frame in time-segments and thus, the active group of transmitters associated with each time segment. Uplink transmitters which are not members of an active group may turn off. Consequently, the uplink receivers (i.e., the receivers located at DP 302) may also turn off. DP vectoring controller 312 further determines a respective a BLT for each one of CPEs $304_1, 304_2, 304_3, \ldots, 304_M$, for each time segment in each uplink transmission mode and consequently with the expected bit-rates for each link. It is, however, noted that for the uplink there is no need to determine a respective precoder and thus no need to determine gain scaling factors since the CPEs do not employ precoding. Rather DP 302 performs cross-talk cancellation. Therefore, DP vectoring controller determines respective cross-talk cancellation coefficients for each active group. DP dynamic resources allocator 308 allocates transmission opportunities to CPEs $304_1, 304_2, 304_3, \ldots, 304_M$ during the uplink transmission portion of the transmission frame. DP dynamic resources allocator 308 transmits to CPEs $304_1, 304_2, 304_3, \ldots, 304_M$ the determined transmission mode and transmission scheme (i.e., for the entire frame for both the downlink transmission portion and the uplink transmission portion) over a management channel related to each frame or super-frame. When receiving uplink transmission from CPES $304_1, 304_2, 304_3, \ldots, 304_M$, DP 302 may perform cross-talk cancellation only with the receivers corresponding to the active group of CPEs, to facilitate power saving. The above mentioned management channel is preferably a separate physical channel (e.g., G.fast robust management channel—RMC), or logical channel (e.g., G.fast EOC) or a combination thereof. The management channel conveys communications control information (e.g., allocated transmission opportunities, BLTs, scaling factors, bandwidth reports and the like) between the DP and the CPEs. Preferably the communication control information is communicated in prior to the pertinent transmission frame. This channel is located in both the downlink transmission portion and the uplink transmission portion.

It will be appreciated by persons skilled in the art that the disclosed technique is not limited to what has been particularly shown and described hereinabove. Rather the scope of the disclosed technique is defined only by the claims, which follow.

The invention claimed is:

1. A transmission method employing a transmission scheme for a plurality of transceiver pairs, each transceiver pair including a first transceiver and a second transceiver, each transceiver including a transmitter and a receiver, each said transceiver pairs defining a downlink between the transmitter of a first transceiver and the receiver of a second transceiver and further defining an uplink between the transmitter of said second transceiver and the receiver of said first transceiver, said transmitter of said first transceiver includes a pre-precoder coupled with the input of a precoder and a transmitting port coupled with the output of said precoder and with said receiver of said second transceiver, each transceiver pair transmitting data over at least a portion of a data transmission frame, said data transmission frame being partitioned into a downlink transmission portion and an uplink transmission portion, said transmission method including the steps of:

partitioning at least said downlink transmission portion of said data transmission frame into a plurality of precoding intervals, each precoding interval being associated with a respective active group of transceiver pairs, each active group of transceiver pairs including a plurality of transceiver pairs, each precoding interval terminating no earlier than the end of a respective downlink data transmission period associated with at least one of the transceiver pairs in the respective transceiver active group; and transmitting by each said transceiver pair according to said transmission scheme, whereby each said transceiver pair transmits a residual cancellation signal during said precoding interval when the duration of said respective precoding interval is longer than said respective downlink data transmission period and when said downlink data transmission period and said respective precoding interval do not overlap one with the other, wherein, a different respective precoder is associated with each said active groups, and wherein, at least the transmitting ports of the first transceivers, which are not members of an active group, turn off.

2. The transmission method according to claim 1, wherein a respective bit loading table is determined for each transceiver pair for at least the entire transmission frame.

3. The transmission method according to claim 1, wherein a respective bit loading table is determined for each transceiver pair for each precoding interval.

4. The transmission method according to claim 1, wherein respective gain scaling factors are determined for each different respective precoder.

5. The transmission method according to claim 1, wherein a transmission plan corresponding to a transmission mode defines down link data transmission opportunities which further define said downlink transmission period, said transmission plan further defining uplink transmission opportunities which further define an uplink transmission period.

6. The transmission method according to claim 5, further including a partition said uplink transmission portion of said data transmission frame into a plurality of time-segments, each time-segment being associated with a respective uplink active group of transceiver pairs, each uplink active group of transceiver pairs including a plurality of transceiver pairs, the uplink active groups corresponding to said transmission mode each time segment terminating no earlier than the end of said respective uplink data transmission period of at least one of the transceiver pairs in the respective transceiver active group, wherein cross-talk cancellation is performed only between the active group of transceivers, and wherein the transmitters of the second transceivers, which are not members of an active group, turn off.

7. The transmission method according to claim 1, wherein each of said active groups is associated with respective expected bit-rate and respective expected power dissipation.

8. The transmission method according to claim 7, wherein a transmission mode is selected according to the respective expected bit-rates and the respective expected power dissipations and according to information related to the data queues status and power dissipation information.

9. The transmission method according to claim 8, wherein said power dissipation information at least include operating temperature and wherein said data transmission information at least include the required amount of data to be transmitted in said transmission frame.

10. A communications system comprising:
a distribution point at least including:
a plurality of distribution point transceivers, each of said distribution point transceivers including a respective pre-precoder, a respective transmission port and a respective receiver, each distribution point transceiver transmitting data over a data transmission frame, said data frame being partitioned into an uplink transmission portion and a downlink transmission portion;

dynamic resources allocator, coupled with said distribution point transceivers and with a vectoring controller, said dynamic resources allocator determines at least one transmission mode, each one of said at least one transmission mode being defined by at least one respective active group of transceiver pairs, said dynamic resources allocator further determines a transmission plan for each of said at least transmission mode, said transmission plan defines the transmission duration for each transceiver pair in each active group, said dynamic resources allocator estimates expected power dissipation according to the transmission duration of each transceiver in each active group; and said vectoring controller, coupled with said distribution point transceivers, said vectoring controller at least determining precoding matrices corresponding to each of at least one active group of distribution point transmitters, said vectoring controller determines at least one bit loading table each of said at least one transmission mode, said vectoring controller further estimates expected bit rate associated with each said at least one transmission mode according to said at least one bit loading table;

wherein, at least the transmitting ports of the distribution point transceivers, which are not members of an active group, turn off.

11. The system according to claim 10, wherein for each said at least one transmission mode, said vectoring controller determines a respective bit loading table for each of said distribution point transceivers for the entire transmission frame.

12. The system according to claim 10, wherein for each said at least one transmission mode said vectoring controller determines a respective bit loading table for each of said distribution point transceivers and for each active group.

13. The system according to claim 10, wherein said dynamic resources allocator selects one of said at least one transmission mode, according to at least one of said expected respective power dissipation and said expected bit rate and a respective at least one of data transmission information and power dissipation information.

14. The system according to claim 10, wherein said transmission plan includes demarcation points, said demarcation points define a partition of at least said downlink portion of said data transmission frame into precoding intervals, each of said active groups is associated with a respective precoding interval, each precoding interval terminates no earlier than the end of a respective downlink data transmission period of at least one of the transceivers in the respective active group, the transmission plan being determined at least according information related to the data queues status and the selected transmission mode.

15. The system according to claim 14, wherein each said distribution point transceivers transmit a residual cancellation signal during said precoding interval when the duration of said respective precoding interval is longer than the respective downlink data transmission period thereof and when said downlink data transmission period and said respective precoding interval do not overlap one with the other.

16. The system according to claim 14, said transmission plan further includes the allocation of downlink and uplink transmission opportunities, and
wherein said dynamic resources allocator determines said uplink transmission opportunities according to information related to uplink data queue status transmitted by said customer premise equipment transmitters to said distribution point.

17. The system according to claim 14, further including at least one customer premise equipment, including a customer premise equipment transceiver, said customer premise equipment transceiver including a customer premise equipment transmitter and a customer premise equipment receiver, said customer premise equipment transmitter transmitting data over said data communication frame during at least a portion of said uplink transmission.

18. The system according to claim 17, wherein said transmission mode further defining at least one active group of customer premise transmitters, said transmission plan further defines uplink demarcation points which define the partition said uplink transmission portion of said data transmission frame into time segments, each time segment is associated with a respective active group of customer premise equipment transceivers, each time segment terminating no earlier than the end of a respective uplink data transmission period of at least one of the customer premise equipment transceiver in the respective transceiver active group, wherein cross-talk cancellation is performed only between the active group of customer premise equipment transceivers, and
wherein the receivers in said distribution point transceivers, corresponding to transmitters of the customer premise equipment transceivers which are not members of an active group, turn off.

19. The system according to claim 17, wherein said customer premise equipment further includes a customer premise equipment controller, coupled with said customer premise equipment transceiver, said customer premise equipment provides said customer premise equipment transceivers with extrinsic parameters relating to the operation thereof, said extrinsic parameters at least related to the service level agreement specified for each user.

20. The system according to claim 10, wherein for each transmission mode said vectoring controller determines respective gain scaling factors for each different precoding matrix corresponding to each of said at least one sub-carrier.

21. The system according to claim 10, wherein said distribution point further includes a distribution point controller, coupled with each of said at least one distribution point transceiver, with said dynamic resources allocator and with said vectoring controller, said distribution point controller provides said distribution point transceivers and said dynamic resources allocator with extrinsic parameters relating to said distribution point, said extrinsic parameters at least include information related to the service level agreement specified for each user.

22. The system according to claim 10, further includes a precoder coupled with each pre-precoder and with each transmitting port, said precoder precodes each data stream corresponding to each sub-carrier respective of each of said transceivers.

* * * * *